(12) United States Patent
Davis

(10) Patent No.: US 10,914,333 B2
(45) Date of Patent: Feb. 9, 2021

(54) SUSPENSION ASSEMBLY

(71) Applicant: Gripple Limited, Sheffield (GB)

(72) Inventor: Simon Davis, Sheffield (GB)

(73) Assignee: GRIPPLE LIMITED

( * ) Notice: Subject to any disclaimer, the term of this patent is extended or adjusted under 35 U.S.C. 154(b) by 0 days.

(21) Appl. No.: 16/463,077

(22) PCT Filed: Nov. 24, 2017

(86) PCT No.: PCT/GB2017/000171
§ 371 (c)(1),
(2) Date: May 22, 2019

(87) PCT Pub. No.: WO2018/100329
PCT Pub. Date: Jun. 7, 2018

(65) Prior Publication Data
US 2019/0376544 A1    Dec. 12, 2019

(30) Foreign Application Priority Data

| Dec. 2, 2016 | (GB) | 1620545.2 |
| Aug. 9, 2017 | (GB) | 1712770.5 |
| Sep. 4, 2017 | (GB) | 1714160.7 |
| Nov. 16, 2017 | (GB) | 1718940.8 |

(51) Int. Cl.
| E21F 17/02 | (2006.01) |
| F16B 7/10 | (2006.01) |
| F16L 3/22 | (2006.01) |
| E04B 9/20 | (2006.01) |
| F16L 3/223 | (2006.01) |

(Continued)

(52) U.S. Cl.
CPC .............. F16B 7/105 (2013.01); F16L 3/222 (2013.01); E04B 9/20 (2013.01); F16L 3/227 (2013.01); F16L 3/2235 (2013.01); F16M 13/027 (2013.01)

(58) Field of Classification Search
CPC ........ H02G 3/263; F16L 3/221; F16L 3/1091; F16B 7/04
See application file for complete search history.

(56) References Cited

U.S. PATENT DOCUMENTS 3,199,815 A * 8/1965 Martinkovic ............. F16L 3/14
248/59
3,226,076 A * 12/1965 Spuhler .................. H02G 3/263
248/327
3,495,796 A    2/1970 Fruh
(Continued)

FOREIGN PATENT DOCUMENTS

| FR | 2540946 A3 | 8/1984 |
| KR | 100260953 B1 | 4/1998 |

(Continued)

*Primary Examiner* — Amy J. Sterling
(74) *Attorney, Agent, or Firm* — Clark Hill PLC; James R. Foley

(57) ABSTRACT

A suspension assembly (10) comprises a support member (12) for supporting an article, an elongate substantially flat strip (14), and a securing arrangement (16). The support member (12) defines an opening (24) through which the strip (14) can be Inserted. The strip (14) defines a plurality of apertures (26). The securing arrangement (16) includes a securing member (18) receivable through a selected one of the apertures (26) in the strip (14) to secure the support member (12) to the strip (14).

20 Claims, 23 Drawing Sheets

(51) Int. Cl.
  *F16L 3/227*  (2006.01)
  *F16M 13/02* (2006.01)

(56) References Cited

U.S. PATENT DOCUMENTS

| | | | | |
|---|---|---|---|---|
| 3,565,375 | A * | 2/1971 | Babb | F16L 3/133 |
| | | | | 248/59 |
| 3,938,767 | A * | 2/1976 | Norris | E21F 17/02 |
| | | | | 248/58 |
| 4,004,768 | A * | 1/1977 | Evans | F01N 13/1822 |
| | | | | 248/59 |
| 4,309,019 | A * | 1/1982 | Bloom | B60K 13/04 |
| | | | | 248/59 |
| 5,791,607 | A | 8/1998 | Thibault et al. | |
| 6,293,056 | B1 | 9/2001 | He | |
| 8,033,511 | B2 * | 10/2011 | Grivas | F16L 59/135 |
| | | | | 248/58 |
| 2018/0003204 | A1 * | 1/2018 | Knutson | F16M 13/027 |

FOREIGN PATENT DOCUMENTS

| | | |
|---|---|---|
| KR | 20160135599 A | 11/2016 |
| WO | 2016/009205 A1 | 1/2016 |

\* cited by examiner

SUSPENSION ASSEMBLY

This invention relates to suspension assemblies. More particularly, but not exclusively, this invention relates to suspension assemblies for suspending articles, such as pipes and cable trays, from overhead.

It is known to suspend pipes and cable trays from roofs or ceilings by mean of brackets attached to threaded rods. The rods have to be cut to length and screwed into attachments in the roof or ceiling. The threaded rods are inserted through openings in the brackets and attached to the brackets using nuts screwed onto the rods. All of these steps, particularly the cutting of the rods, can be very time consuming.

According to one aspect of this invention, there is provided a suspension assembly comprising a support member for supporting an article, an elongate substantially flat strip, and a securing arrangement, the support member defining an opening through which the strip can be inserted, and the strip defining a plurality of apertures, wherein securing arrangement includes a securing member receivable through a selected one of the apertures in the strip to secure the support member to the strip.

The suspension assembly may comprise first and second of the substantially flat strips, wherein the support member defines first and second openings through each of which a respective strip can be inserted. Each of the first and second strips may define a plurality of apertures. The securing arrangement may include respective first and second securing members which may be receivable through a respective selected one of the apertures in each strip to secure the support member to the strips.

According to another aspect of this invention, there is provided a suspension assembly comprising a support member for supporting an article, first and second elongate substantially flat strips, and a securing arrangement, the support member defining first and second openings through which the strips can be inserted, and each strip defining a plurality of apertures, wherein the securing arrangement comprises first and second securing members, each being receivable through a respective selected one of the apertures in each strip to secure the support member to the strips.

The support member may be elongate. Each of the first and second openings may be defined at opposite end regions of the support member. Each of the first and second openings may be elongate.

The, or each, aperture defined in the, or each, strip may be a slot. The, or each, strip may comprise a strap.

Each of the apertures defined in the first and second strips may be a slot. The strip may comprise a strap. Each of the first and second strips may comprise a strap.

The strip may be deformable to a stowed condition, in which a stowable region of the respective strip extends along the support member. Each of the first and second strips may be deformable to a respective stowed condition, in which a stowable region of each strip extends along the support member.

The, or each, strip may be formed of a malleable material to allow it to be deformed to the stowed condition.

The strip may be formed of a metallic material. Where the securing assembly comprises first and second strips, each of the first and second strips may be formed of a malleable material to allow them to be deformed to the stowed condition. Each of the first and second strips may be formed of a metallic material.

The, or each, securing member may comprise a respective latch member. Where the securing arrangement comprises first and second securing members, the first securing member may comprise a first latch member, and the second securing member may comprise a second latch member.

The latch member may be movable between securing and non-securing positions. In the securing position, the strip may be secured to the support member. In the securing position, the latch member may be received by the aperture in the strip.

In the non-securing position, the strip can be moved relative to the support member. In the non-securing position, the latch member may be not received by the apertures in the, or each, strip. The latch member may be slidably movable between the securing and non-securing positions.

Where the securing arrangement comprises first and second latch members, each latch member may be movable between respective securing and non-securing positions.

In the securing positions, each strip may be secured to the support member. In the securing positions, each latch member may be received by the aperture in the respective strip.

In the non-securing positions, each strip can be moved relative to the support member. In the non-securing position, each latch member may be not received by the apertures in the respective strip. Each latch member may be slidably movable between the securing and non-securing positions.

The securing arrangement may comprise urging means for urging the, or each, latch members to the securing position. The urging means may be resilient.

In one embodiment comprising first and second latch members, the urging means may comprise first and second urging members. Each of the first and second urging members may urge a respective one of the first and second latch members so that the latch members are received by the apertures in the first and second strips. In this embodiment, the urging members may comprise springs, such as tension springs.

In another embodiment, the urging means may comprise an urging member extending between the first and second latch members. The urging member may urge both of the first and second latch members to their securing positions. In this embodiment, the urging member may comprise a spring, such as a compression spring.

The support member may have a guide formation to cooperate with the latch member. The guide formation may hold the latch member on the support member and may allow the latch member to move between the securing and non-securing positions.

In the embodiment in which the securing arrangement comprises first and second latch members, the support member may have first and second guide formations to cooperate respectively with the first and second latch members. Each guide formation may hold the respective latch member on the support member and may allow each, latch member to move between the securing and non-securing positions.

The, or each, latch member may comprise a main portion. The, or each, latch member may include a cooperating portion to cooperate with the guide formation of the support member.

The support member may comprise oppositely arranged first guide formations and oppositely arranged second guide formations. The latch members may comprise a pair of oppositely arranged cooperating portions configured to cooperate with the first and second guide formations.

In the embodiment in which the securing arrangement comprises first and second latch members, the support member may comprise pair of oppositely arranged first guide formations and a pair of oppositely arranged second guide formations.

Each of the first and second latch members may comprise a pair of oppositely arranged cooperating portions configured to cooperate with the first and second guide formations.

The support member may comprise a central portion and a pair of opposed wall portions extending from the central portion. The, or each, guide formation may be an elongate hole. The, or each, guide formation may be defined in one of the wall portions, or in a region between the central portion and the wall portions.

The cooperating portions of the, or each, latch member may be a protrusion which extends from the main portion. The, or each, guide formation may be an elongate hole defined by the support member. The cooperating portion of the, or each, latch member may be received in the, or one of the, elongate holes.

The wall portions may comprise first and second detent members to lock the cooperating portions in the guide formations. The first and second detent members may allow the cooperating guide formations of the latch members to cooperate with the guide formations of the support.

One of the detent members may be formed in one of the wall portions. The second detent member may be provided in the other wall portion.

The detent members may be attached to the wall portions at an attachment region spaced from the central portion. The detent members may extend from the attachment region towards the central portion.

A respective single detent member may be provided on each of the wall portions for a respective one of the latch members.

Each latch member may comprise an insertion portion on the main portion. The insertion portion may be inserted through the selected aperture in the respective first and second strips to secure the strips to the support member.

The, or each, latch member may comprise an end portion. The end portion may be connected to the main portion. The end portion may extend transverse to the main portion.

The, or each, latch member may include a connecting element extending from the main portion beyond the insertion portion to the end portion.

The, or each, latch member may include a pair of the aforesaid connecting elements. The connecting elements may extend on respective opposite sides of the insertion portion.

The end portion may extend across an end region of the support member, to allow the latch member to be pushed into the support member by pushing the end portion.

The, or each, latch member may comprise a projecting portion extending transverse to the main portion. The projecting portion may have an edge capable of providing a fulcrum about which the strip can be deformed when the strip is deformed to the stowed condition.

In this embodiment, the urging member may comprise a pair of opposite legs. The legs may be shaped to provide resilience to the urging means. The urging means may comprise a leaf spring. The leaf spring may be attached to the support member.

Each wall portion may include an attachment element to attach the urging means to the support member. Each attachment element may cooperate with a respective one of the legs to attach the urging means to the support member.

The, or each, latch member may define an elongate aperture to allow the latch member to be slidably mounted on the support member. The suspension assembly may comprise an mounting member, or two mounting members, extending through the support member to attach the, or each, latch member to the support member.

The mounting member may comprise a rivet. The mounting member may be selected so that it is able to bear the intended load on the suspension assembly, in the event that the support member is installed upside down.

The suspension assembly may comprise a locking arrangement to lock the, or each, latch member in the securing position. The locking arrangement may include a locking member, or two locking members. The, or each, locking member may be movable between locked and unlocked positions.

The, or each, latch member may comprise a cooperating formation, which may be on the end portion, to engage the locking member when the latch member is in the securing position, and the locking member is in the locked position. The cooperating formation may comprise a lug.

The locking member is arranged so that, when the latch member is in the non-securing position, the locking member engages the end portion if the locking member is moved towards the locked position. Desirably, the end portion has inner and outer lugs. The locking member may be disposed between the inner and outer lugs when the latch member is in the non-securing position.

This has the effect of preventing the locking member from being moved fully to the locked position, and provides the advantage in the embodiments described herein that it prevents the latch member from being locked in the non-securing position.

The locking member may have a plurality of side members. The locking member may have four of the side members.

The locking members may have a transverse portion extending between the side members. The transverse portion may be substantially flat.

Two opposite side members may each have a recessed middle portion. The locking member may have a pair of opposed insertion members, which may extend between the opposite recessed middle portions.

A respective detent member may extend from each of the recessed portions. When the locking member is mounted on the support member, the insertion members may be received in an aperture at an end region of the support. The insertion members may locate the locking member over the aperture. The detent members may hook over opposite edges of the aperture.

The support member may include a holding formation to hold the aforesaid stowable region of the strip in the stowed condition. The holding formation may comprise a holding tab. The holding formation may be movable from a non-holding position to a holding position. The movement of the holding formation between the holding and non-holding positions may be by deforming the holding formation, for example, by bending the holding formation.

When the holding formation is in the holding position, the holding formation may extend across the stowable region of the strip to hold said stowable region in the aforesaid stowed condition. The holding formation may be provided in one of the wall portions.

The wall portions may have first and second opposite edges. Each wall portion may be attached to the central portion along the first edge. The second edge may be a free edge.

The holding formation may be provided along an edge of the wall portion. Desirably, the holding formation is provided along the second edge.

The support member may comprise a plurality of the holding formations, for example two of the holding formations.

Embodiments of the invention will now be described by way of example only, with reference to the accompanying drawings, in which.

FIGS. 1 to 5 of the drawings show a suspension assembly 10, which comprises an elongate support member 12 and first and second substantially flat strips 14. The strips 14 are in the form of first and second elongate metallic straps disposed at opposite end regions 22 of the elongate support member 12.

Figure 2:
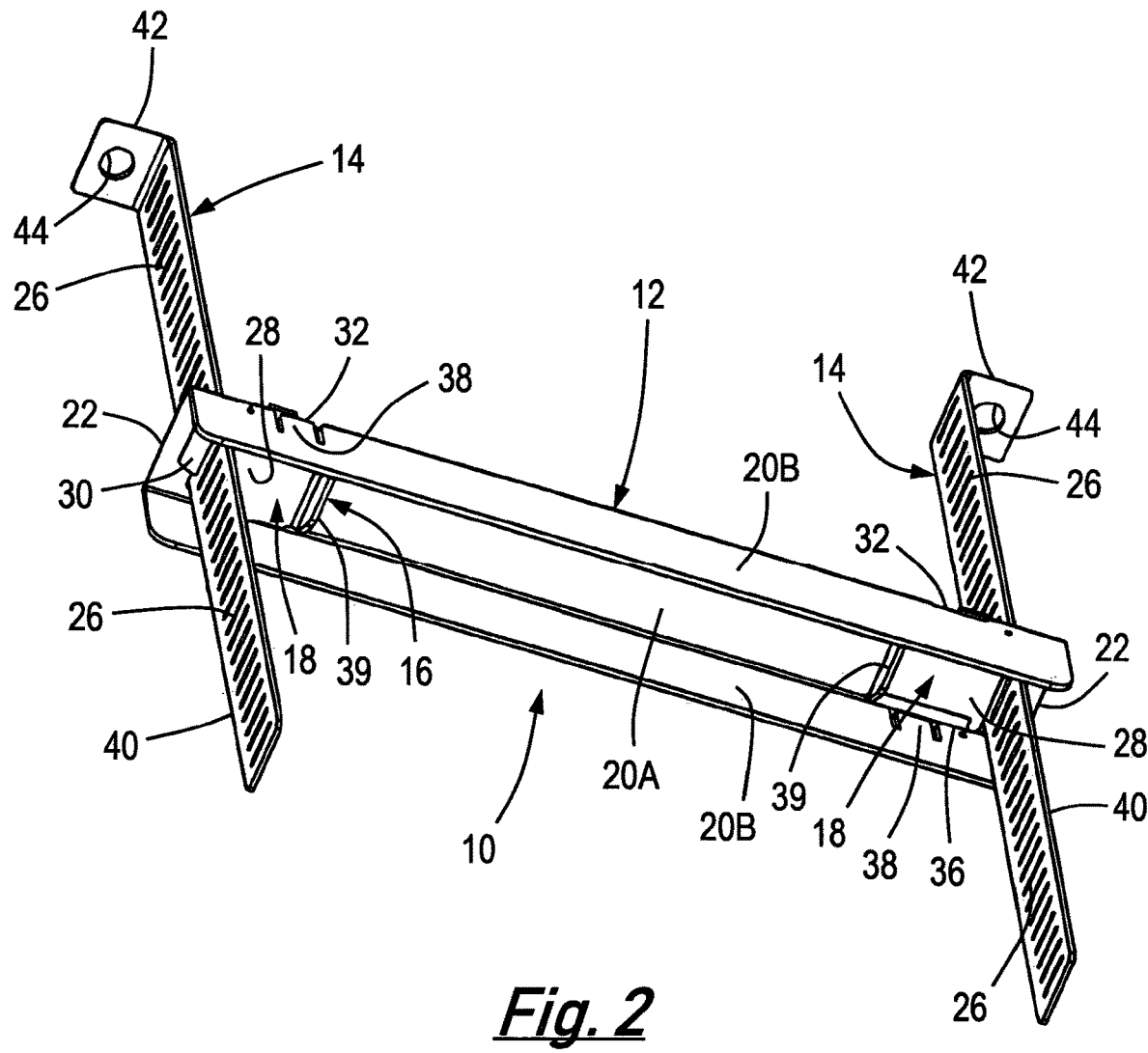
FIG. 2 is a bottom perspective view of the suspension assembly.
Figure 3:
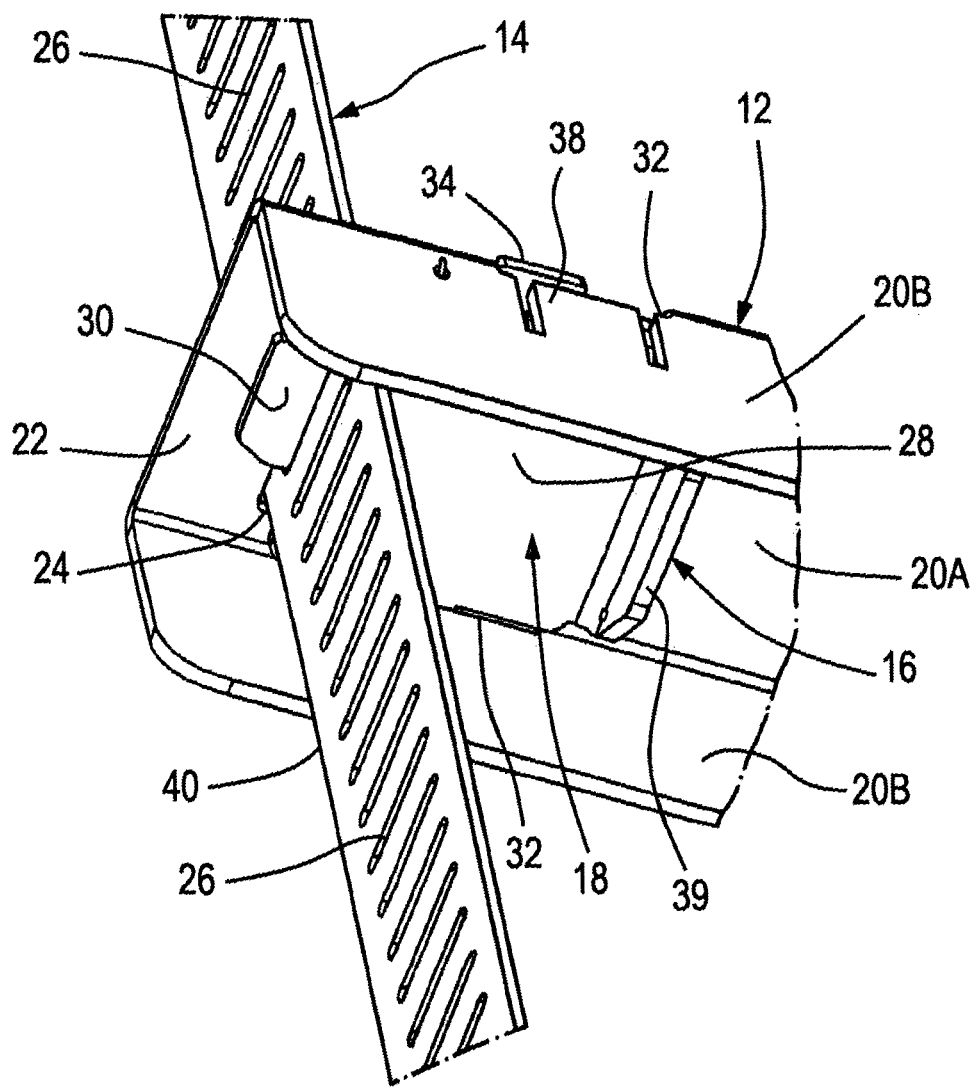
FIG. 3 is a close up view of one end region of the suspension assembly as shown in FIG. 2.
Figure 4:
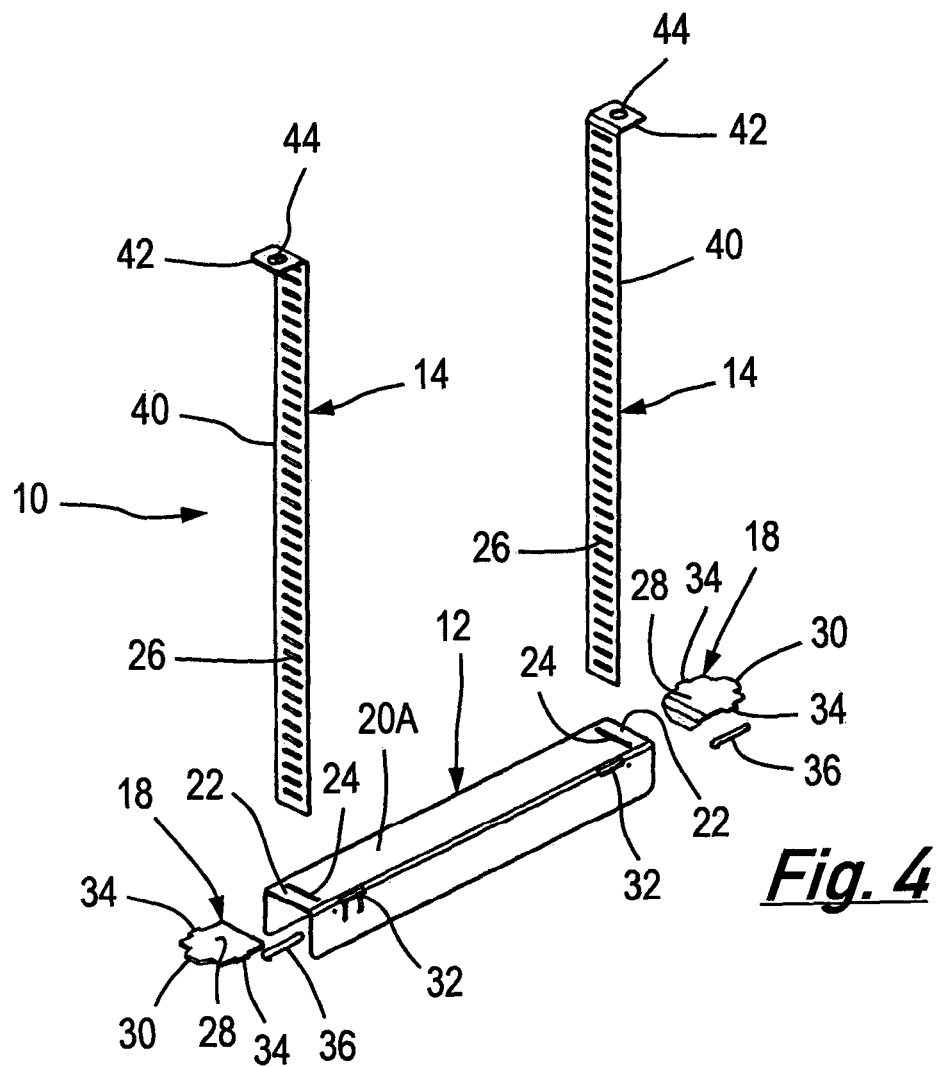
FIG. 4 is an exploded top perspective view of the suspension assembly.
Figure 5:
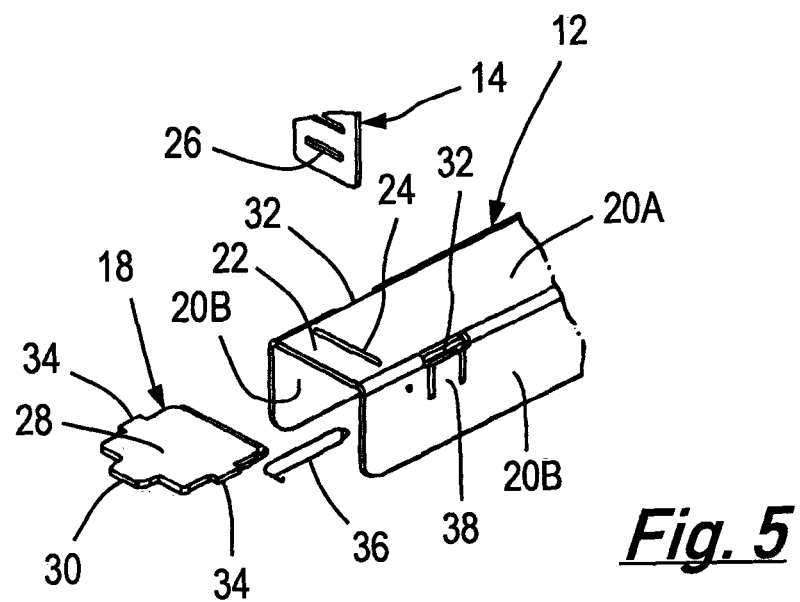
FIG. 5 is a close up view of one end region of the suspension assembly, as shown in FIG. 4.
Figure 6:
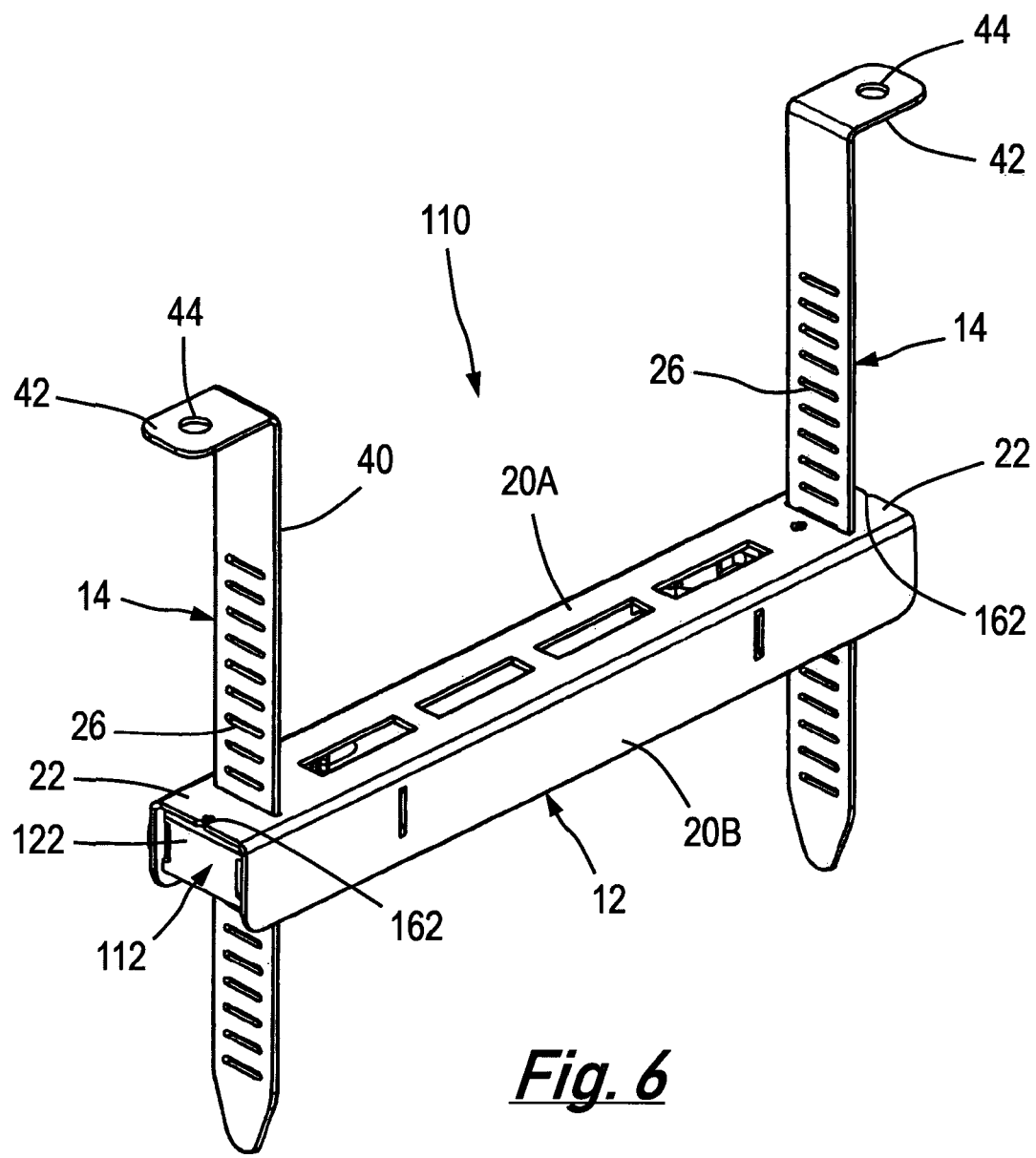
FIG. 6 is a top perspective view of a further suspension assembly.
Figure 7:
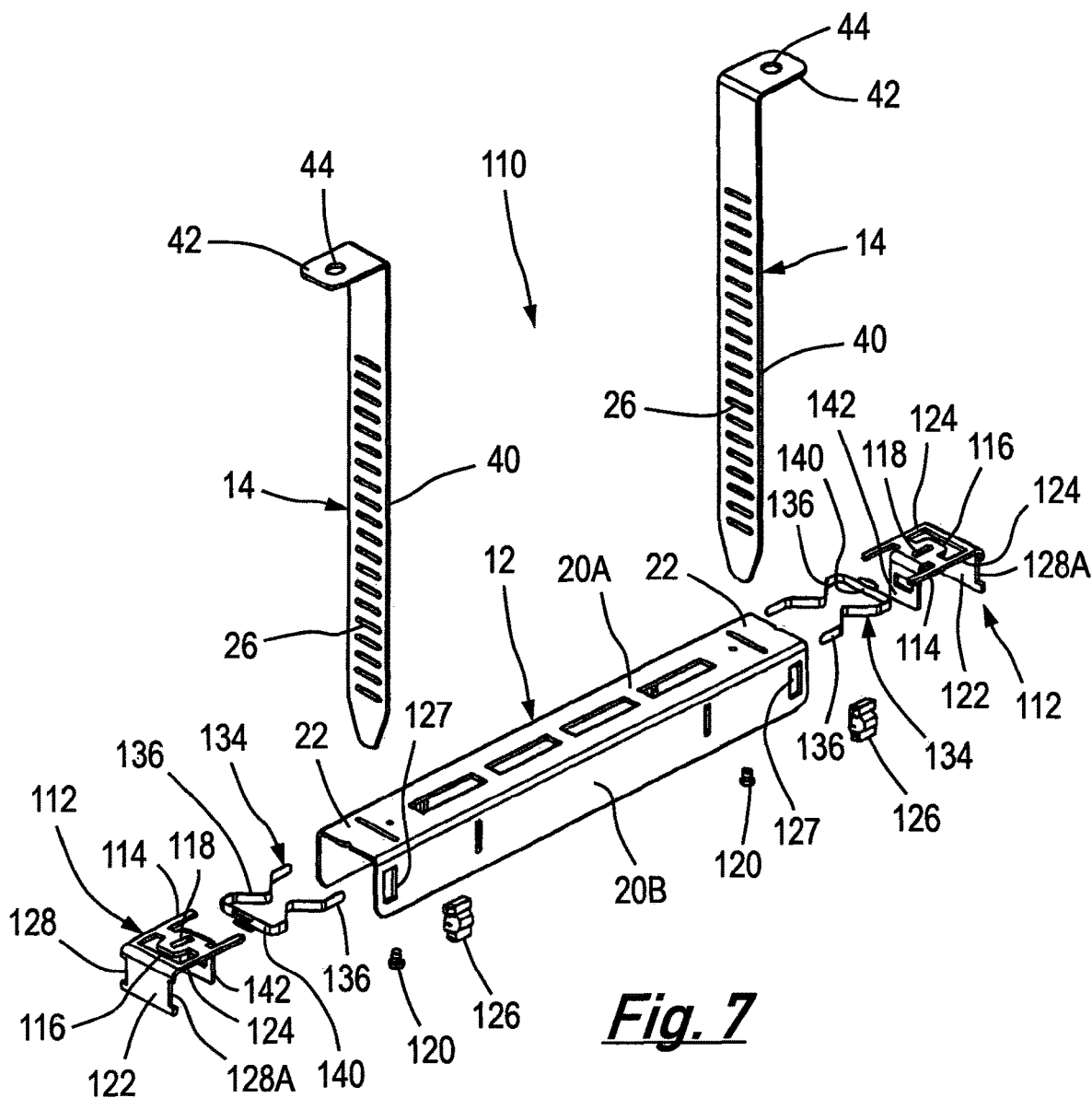
FIG. 7 is an exploded top perspective view of the suspension assembly shown in FIG. 6.
Figure 8:
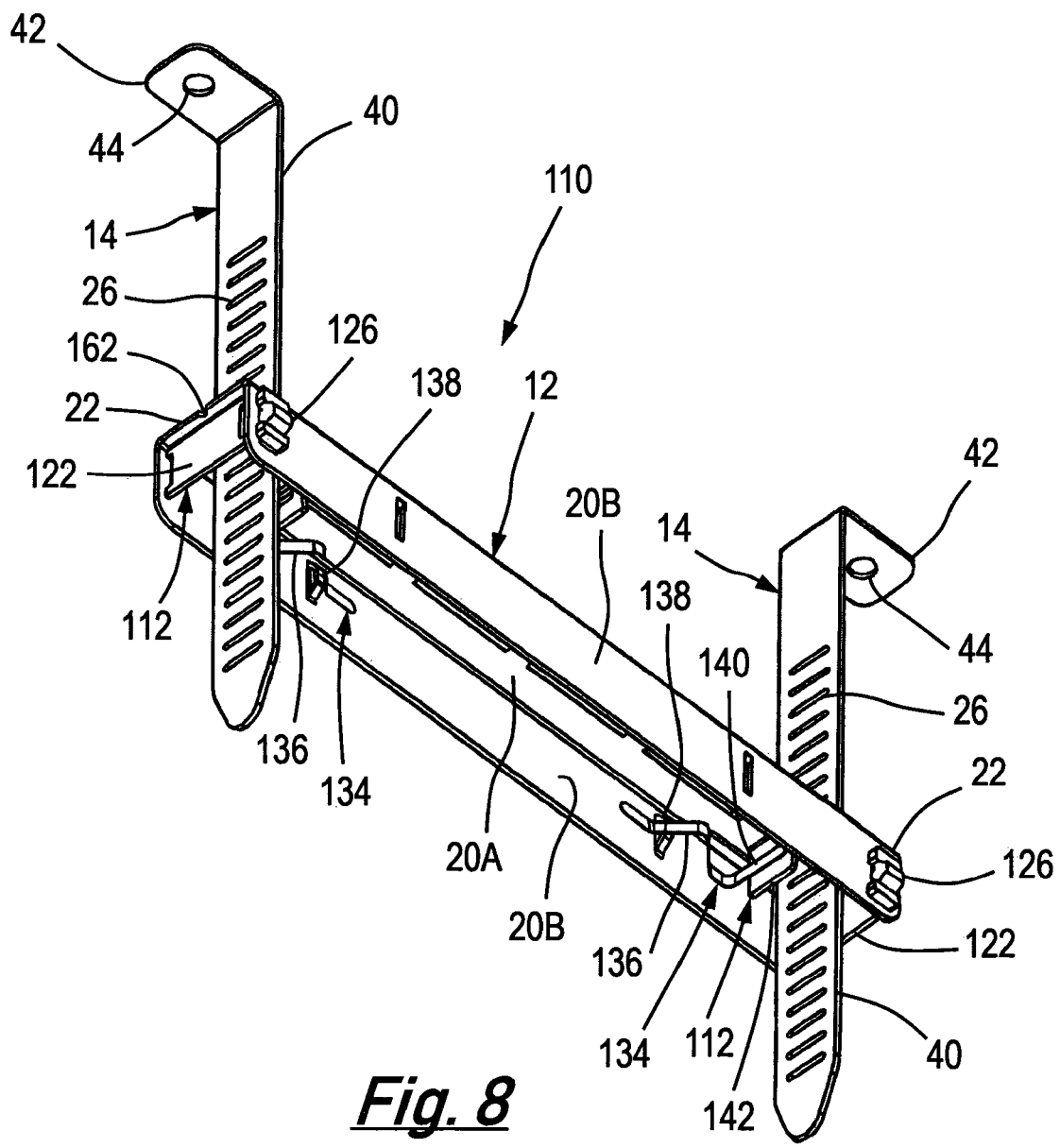
FIG. 8 is a bottom perspective view of the suspension assembly shown in FIG. 6.
Figure 9:
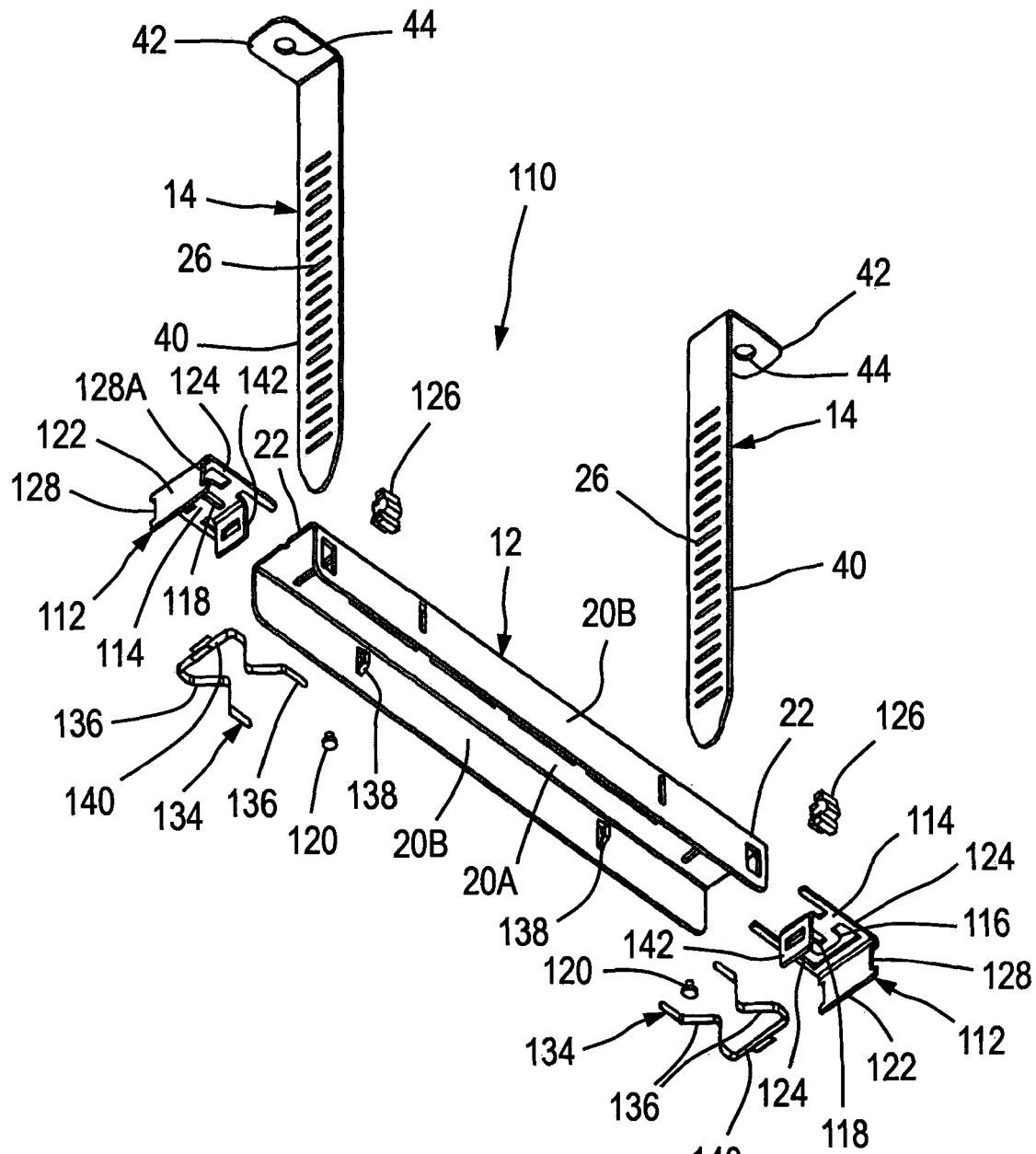
FIG. 9 is an exploded bottom perspective view of the suspension assembly shown in FIG. 6.
Figure 10:
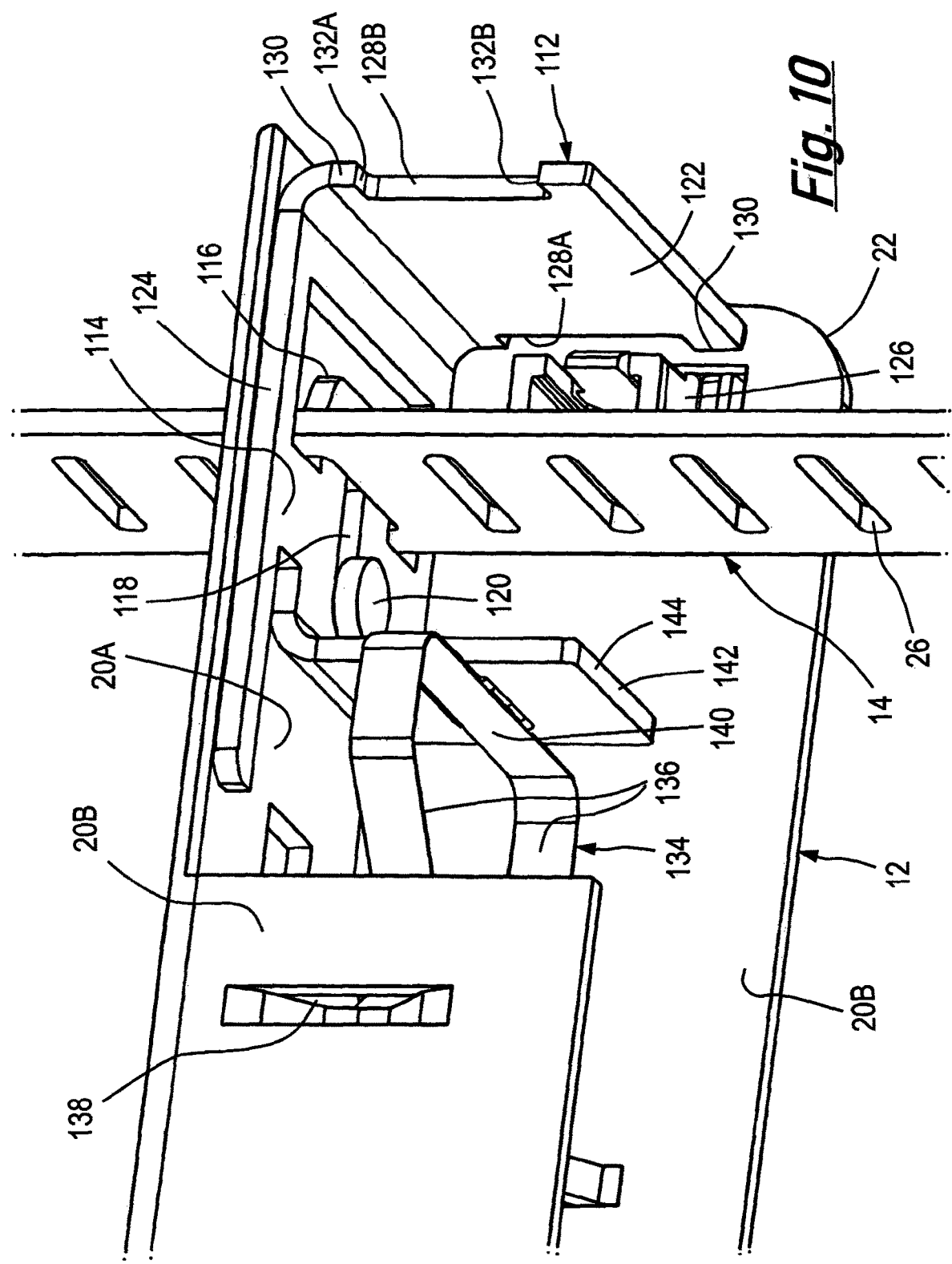
FIG. 10 is a close up part sectional view showing a securing member in a securing position, securing a flat strip to a support member.

The strips 14 are secured to the support member 12 by a securing arrangement 16 (see FIGS. 2 and 3). The securing arrangement 16 comprises securing members in the form of first and second latch members 18 arranged at the opposite end regions 22 of the support member 12.

The support member 12 comprises an elongate central portion 20A and a pair of opposed wall portions 20B extending from the central portion 20A. The central portion 20A defines first and second elongate openings 24 at the respective opposite end regions 22 of the support member 12. Each of the first and second strips 14 is received through a respective one of the first and second openings 24.

Each of the first and second strips 14 defines a plurality of slots 26 along the length of the respective strip 14. Each of the first and second latch members 18 comprises a main portion 28 and an insertion portion 30.

The insertion portions 30 can be inserted through a selected one of the slots 26 in each of the first and second strips 14, thereby securing the strips 14 to the support member 12.

Each of the support members 12 comprises guide formations for guiding the latch members 18. The guide formations are in the form of respective first and second elongate holes 32 defined by the wall portions 20B at the first and second end regions 22 of the support member 12.

Each of the latch members 18 comprises a pair of opposite cooperating portions 34 in the form of protrusions on the main portion 28. The cooperating portions 34 are received by the elongate holes 32 in the wall portions 20B.

The elongate holes 32 are longer than the cooperating portions 34 to allow the latch members 18 to slide between securing and non-securing positions.

When the first and second latch members 18 are in the respective securing positions, the insertion portions 30 are received in the selected slots 26 in the first and second strips 14. This is illustrated in FIG. 3.

When the first and second latch members 18 are in the respective non-securing positions, the insertion portions 30 are not received in any of the slots 26 in the first and second strips 14, thereby allowing the strips 14 to be slid through the openings 24.

The securing arrangement further includes urging means for urging the first and second latch members 18 to the securing positions. In the embodiment shown, the securing arrangement comprises first and second urging members in the form of first and second tension springs 36.

The first and second tension springs 36 are attached respectively to the first and second latch members 18 and to the support member 12 by means of hooks at opposite ends of the tension springs 36. The hooks are received in respective holes in the support member 12 and in the latch members 18, as would be understood by those skilled in the art.

First and second detent members 38 are provided on respective wall portions 20B at opposite end regions 22 of the support member 12. The detent members 38 allow the latch members 18 to be mounted on the support member 12.

Only one detent member 38 is provided at each of the end regions 22, but it will be appreciated that a respective detent member 38 could be provided in each wall portion 20B at each of the end regions 22.

The first and second latch members 18 are pressed into place between the wall portions 20B until the cooperating portions 34 are received in the elongate holes 32.

As the first and second latch members 18 are pressed into place, the cooperating portions 34 push the detent members 38 outwardly until the cooperating portions 34 are received in the elongate holes 32

Each of the latch members 18 includes a tab 39 (see FIGS. 2 and 3) to allow the user to pull the latch member 18 to its non-securing position, thereby allowing the position of the support member 12 to be adjusted relative to the strips 14.

Each of the strips 14 comprises an elongate portion 40, in which the slots 26 are defined. Each strip 14 has an attaching portion 42 for attaching the strips 14 to, for example, a roof or a ceiling.

The attaching portion 42 defines a circular aperture 44 through which a fastener (not shown), such as a screw or a bolt, can be inserted to attach the strip 14 to the roof or ceiling.

In one method of using the suspension assembly 10, the strips 14 are attached to the roof or ceiling by means of the fastener. The latch members 18 are pulled to their non-securing positions by the user to allow the support member 12 to be mounted on the strips 14.

The strips 14 are inserted through the openings 24 in the first and second end regions 22 of the support member 12. The support member 12 can be slid along the strips 14 to a desired position relative to the strips 14 while the latch members 18 are held in their non-securing positions.

The user then releases the latch members 18 so that the tension springs 36 urge the latch members 18 to their securing positions, in which the insertion portions 30 are received in one of the slots 26 in each strip 14.

Figure 1:
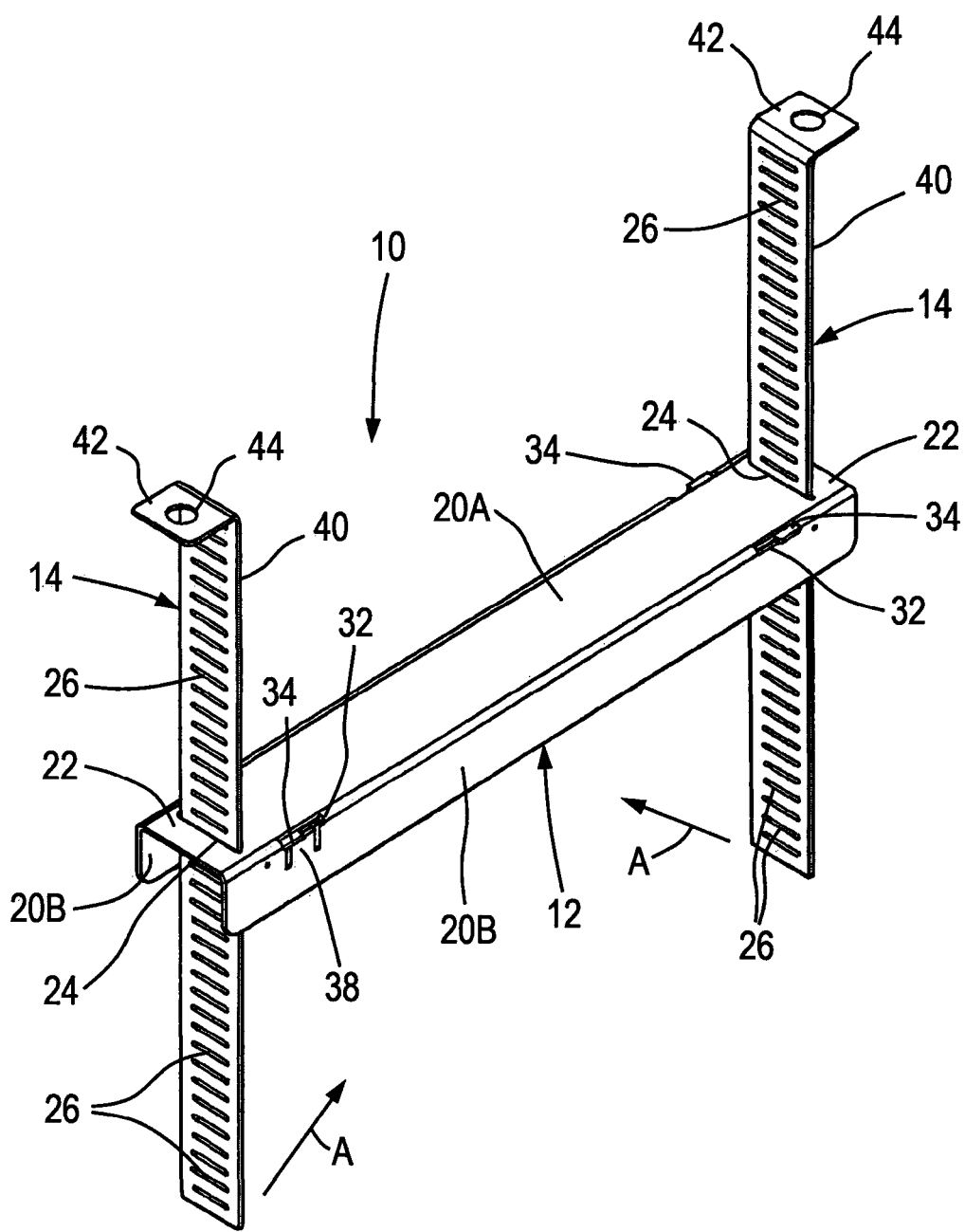
FIG. 1 is a top perspective view of a suspension assembly.

The portions of the strips 14 extending below the support member 12 can then be deformed to a stowed condition by bending them upwardly, as shown by the arrow A in FIG. 1.

There is thus described a suspension assembly 10, which allows quick installation, without the need to cut any of the components.

Various modifications can be made without departing from the scope of the invention. For example, the support member 12 could be of any suitable length. Also, the two tension springs 36 could be replaced by a single compression spring extending between the first and second latch members 18.

Further embodiments may include one or more of the following: the securing arrangement 16 may include locking formations for locking the latch members 18 in the securing positions; the slots 26 in the strips 14 may instead be holes that are not elongate; the slots 26 or the holes may be arranged in pairs; the attaching portion 42 may be provided with reinforcement; and the support member 12 may include formations such as slots or hooks to facilitate attachment of articles (e.g. pipes, cable tray).

FIGS. 6 to 15 show a further embodiment of the suspension assembly, generally designated 110. The suspension assembly 110 comprises many of the features of the suspension assembly 10. These features have been designated with the same reference numerals as the corresponding features in FIGS. 1 to 5.

The suspension assembly 110 comprises a latch member 112 slidably attached to the support member 12. The latch member 112 is slidably movable between securing and non-securing positions.

The latch member 112 has a main portion 114 and a securing portion 116 extending from the main portion 114. The securing portion 116 is receivable in a selected one of the slots 26 in the strip 14.

The main portion 114 defines an elongate aperture 118. A mounting member 120 in the form of a rivet is received through the elongate aperture 118. There is, therefore, relative sliding movement between of the mounting member 120 and the main portion 114 when the latch member 112 slides between the securing and no-securing positions.

The mounting member 120 is in the form of a rivet, which can bear the working load of the suspension assembly 110 in the event that the support member 12 is used upside down.

The latch member 112 further includes an end portion 122 connected to the main portion by a pair of connecting elements 124. The connecting elements 124 extend from the main portion 114, to the end portion 122 so that the securing portion 116 is arranged between the main portion 114 and the securing portion 116. The securing portion 116 is also arranged between the connecting elements 124.

The suspension assembly 110 also includes a locking arrangement for locking the latch members 112 in their securing positions. The locking arrangement comprises two locking members 126 arranged on the support member 12 adjacent the respective opposite ends 22 thereof. The locking members 126 are attached to the support 12 at apertures 127, by means of insertion portions and detents, as explained below with reference to FIGS. 21 to 26.

Figure 12:
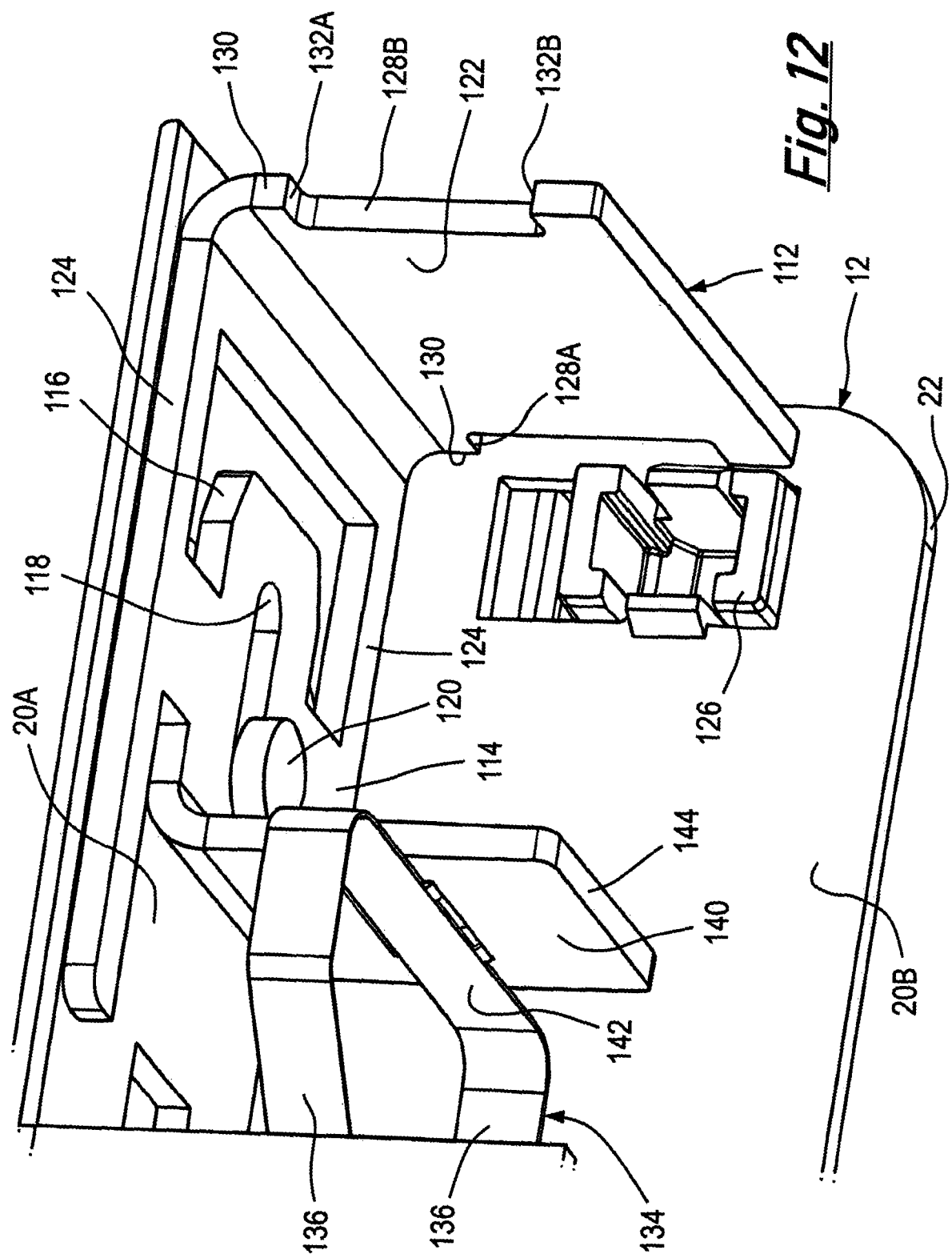
FIG. 12 is a close up part sectional view showing the securing member in a securing position and a locking member in a locked position, but with the flat strip omitted for clarity.
Figure 13:
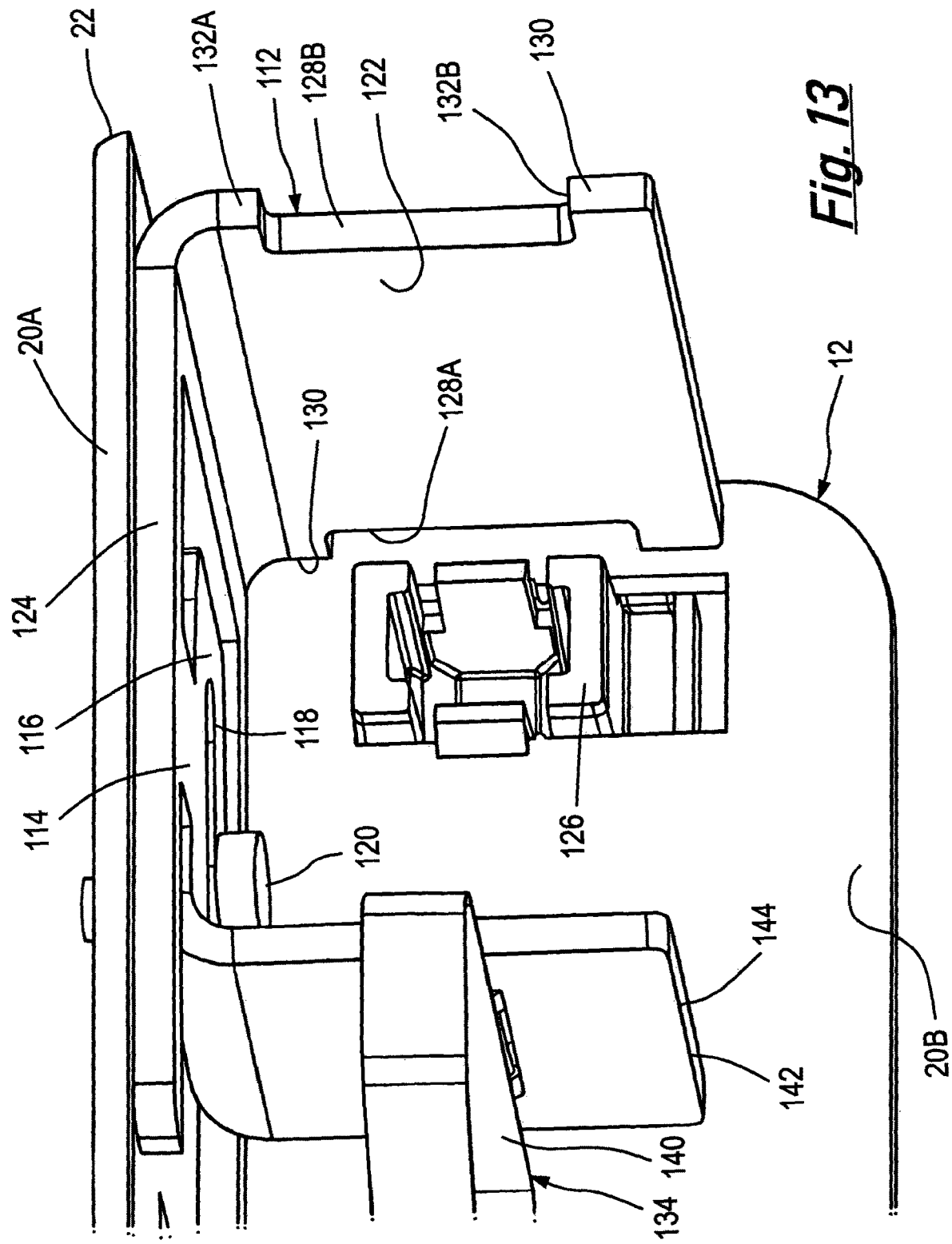
FIG. 13 is a view similar to FIG. 12, with the locking member in an unlocked position.
Figure 14:
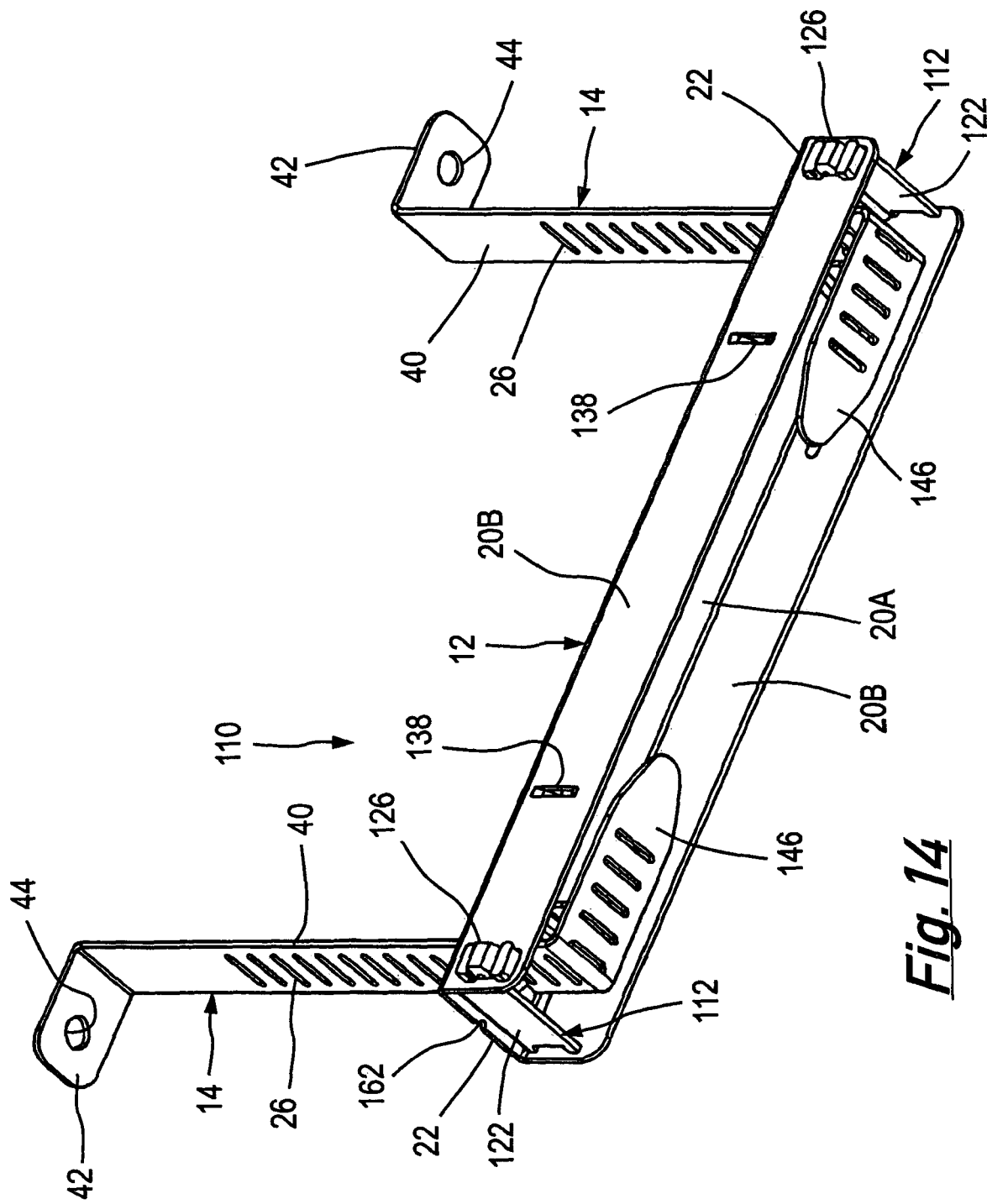
FIG. 14 is a bottom perspective view of the securing assembly shown in FIG. 6, showing end regions of the flat strips deformed into a stowed condition.

Each locking member 126 comprises a button, and can be slid between a locked position shown in FIG. 12, and an unlocked position shown in FIG. 13. The end portion 122 of the latch member 112 defines two recesses 128A, 128B in the opposite side edges 130. One of the recesses, designated 128A, is defined in the side edge 130 adjacent the locking member 126.

The end portion 122 includes cooperating formations in the form of inner and outer lugs 132A, 132B on the opposite edges 130. The recesses 128A, 128B are defined between the inner and outer lugs 132A, 132B.

Arranging the locking member 126 in the unlocked position, aligns the locking member 126 with the recess 128A. This allows the end portion 122 to move across the locking member 126 when the latch member 112 is moved between the non-securing and the securing positions.

When the latch member 112 is in the securing position, and the locking member 126 is moved to the locked position, as shown in FIG. 12, the outer lug 132B engages the locking member 126 to prevent the latch member 112 moving to the non-securing position.

Figure 11:
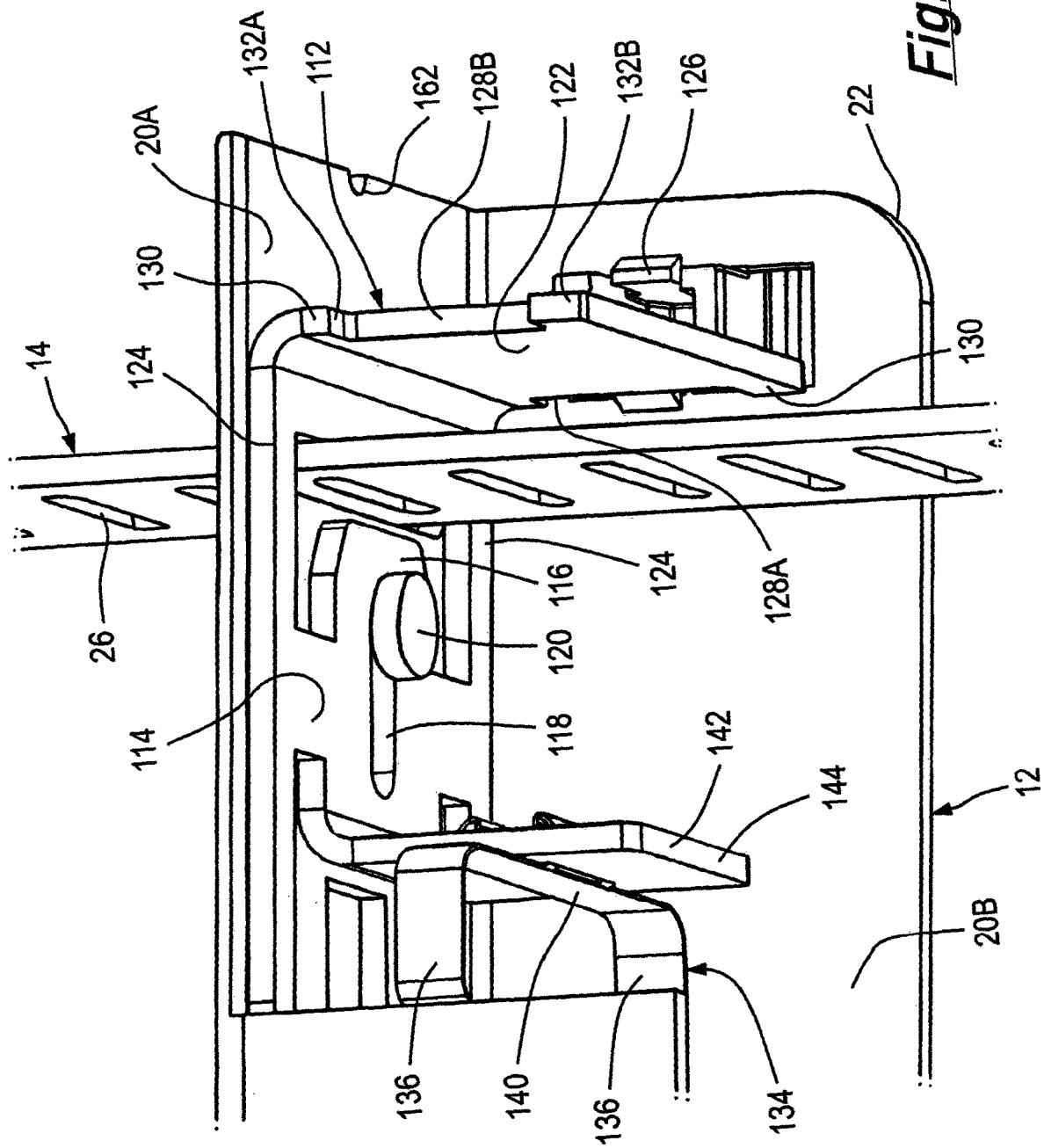
FIG. 11 is a close up view similar to FIG. 10, but showing the securing member in a non-securing position.

When the latch member 112 is in the non-securing position, the end portion 122 extends across the locking member 126 in its unlocked position, so that the inner lug 132A is disposed above the locking member 126 and the outer lug 132B is disposed below the locking member 126, as shown in FIG. 11. This prevents the locking member 126 being moved to its locked position, thereby preventing the latch member 112 being locked in its non-securing position.

The securing arrangement further includes resilient urging means 134. The urging means 134 comprises a leaf spring having a pair of opposite legs 136. The legs 136 are deformed into V shapes to provide the required resilience. The urging means 134 urges the latch member 112 towards the securing position.

The urging means 134 is attached to the support member 12 by means of a pair of attaching elements 138 on the opposed wall portions 20B of the support member 12. The attaching elements 138 engage the legs 136 to attach them to the respective wall portion 20B.

The urging means 134 further includes a cross member 140 extending between the legs 136. The latch member 112 includes a projecting portion 142 extending transverse to the main portion 114. In use, the projecting portion 142 extends downwardly from the main portion 114. The urging means 134 is attached to the member 112 at the projecting portion 142.

Figure 15:
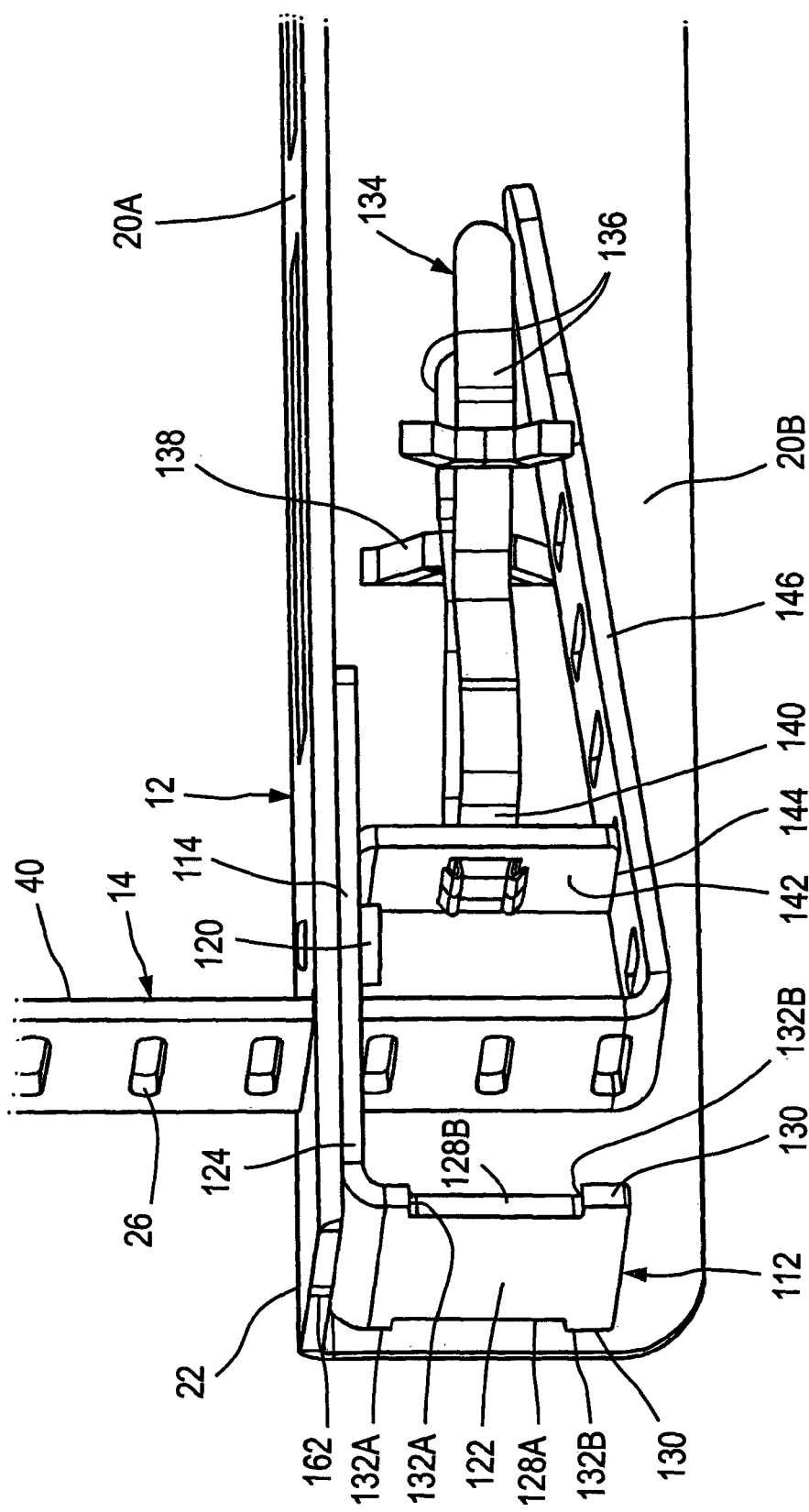
FIG. 15 is a close up sectional view showing one of the flat strips in the stowed condition.

The projecting portion 142 has a lower edge 144 providing a fulcrum about which the strip 14 can be bent when the strip 14 is deformed to the stowed condition. In this connection, reference is made to FIGS. 14 and 15, which show stowed regions 146 of the strips 14. FIG. 15 shows one of the stowed regions 146 deformed over the lower edge 144 of the projecting portion 142.

Referring to FIGS. 16 to 20, there is shown a modified version of the suspension assembly 110 shown in FIGS. 6 to 15. The suspension assembly 110 shown in FIGS. 16 to 20 comprises all the features of the suspension assembly shown in FIGS. 6 to 15, and these features have been designated with the same reference numerals in FIGS. 16 to 20 as the corresponding features in FIGS. 6 to 15.

The suspension assembly 110 shown in FIGS. 16 to 20 further includes holding formations in the form of two holding tabs 150 in one of the wall portions 20B of the support member 12. Although the holding tabs 150 are shown provided only on one of the wall portions 20B. It will be appreciated that each of the wall portions 20B may include holding tabs 150. However, in the suspension assembly 110 shown in FIGS. 16 to 20, the holding formations are provided only on one of the wall portions 20B.

The wall portions 20B have first and second opposite edges, the first edge is attached to the main portion 20A. The second edge is a free edge. The holding formations are provided along the second edge.

Each of the holding tabs 150 is formed as a cut out in the wall portion 20B, and has an end attached to the wall portion 20B.

Figure 16:
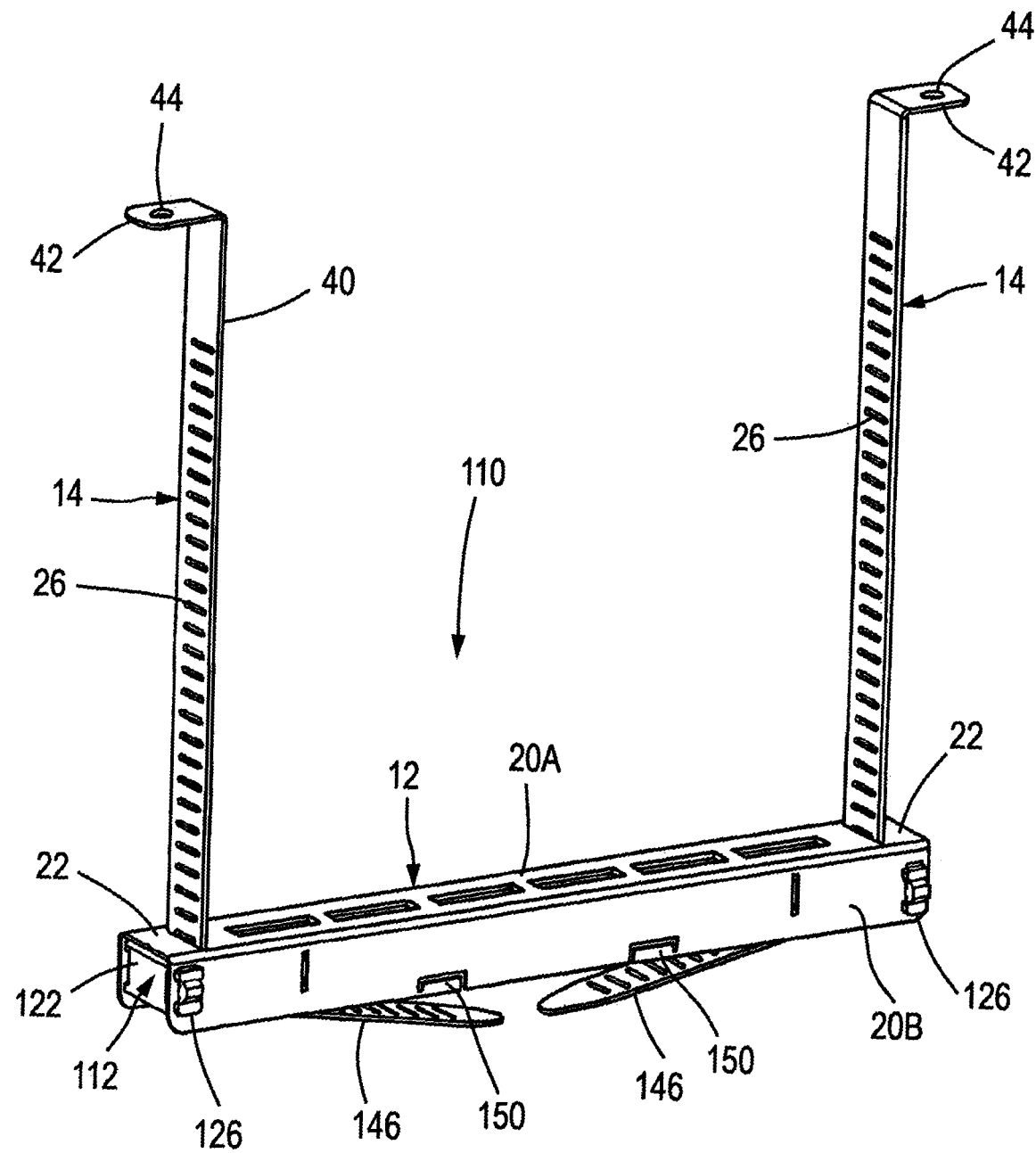
FIG. 16 is a perspective view of a modified version of the suspension assembly shown in FIGS. 6 to 15, having holding formations.
Figure 17:
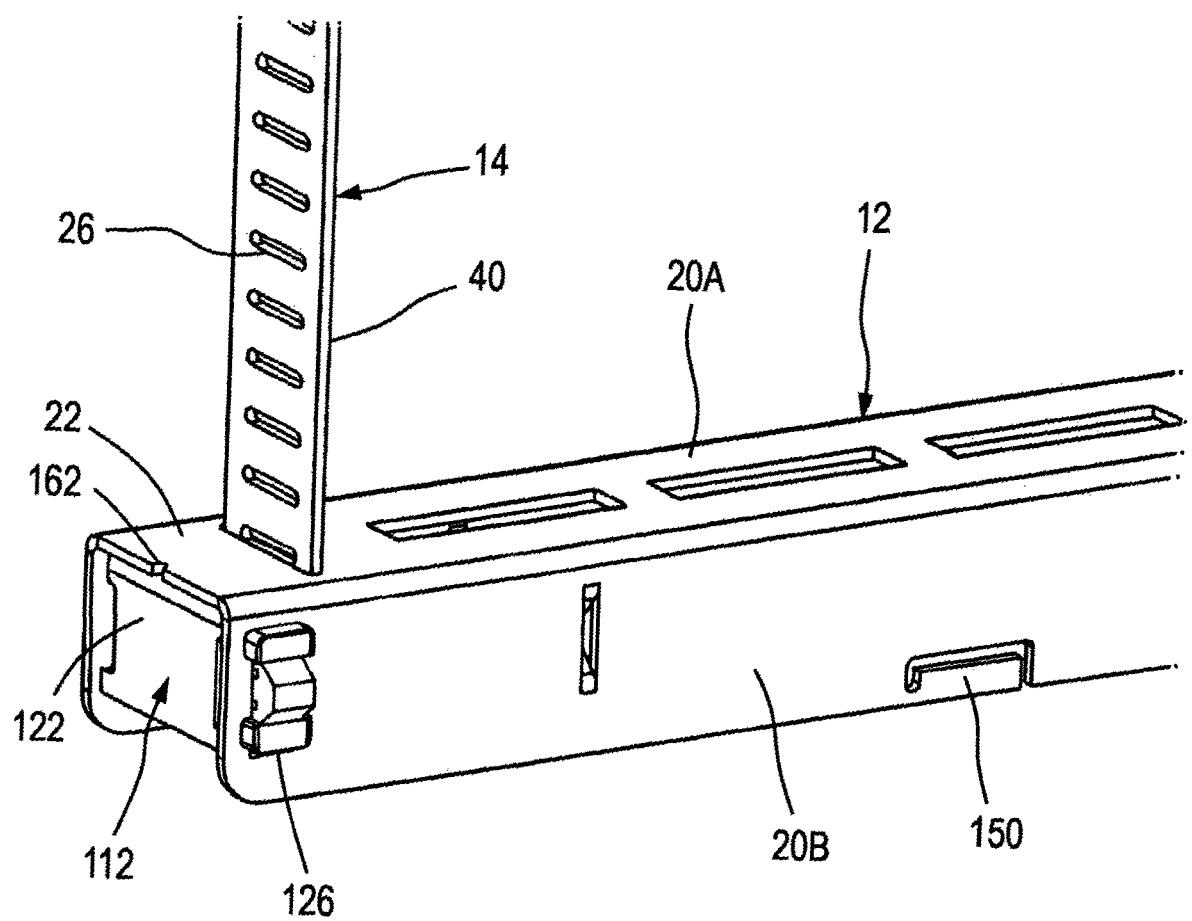
FIG. 17 is a close up view of a region of the support assembly shown in FIG. 16.
Figure 18:
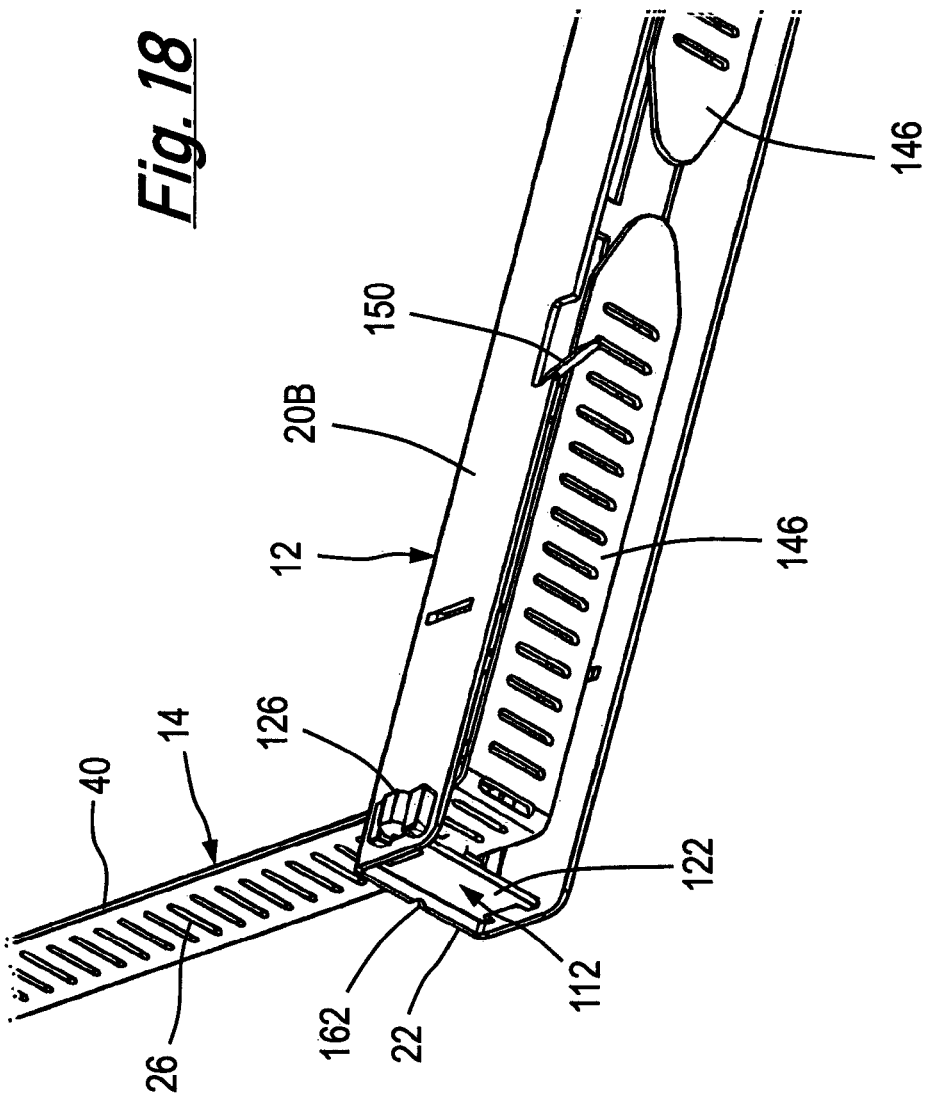
FIG. 18 is a perspective view from below of the region of the support assembly shown in FIG. 17.
Figure 19:
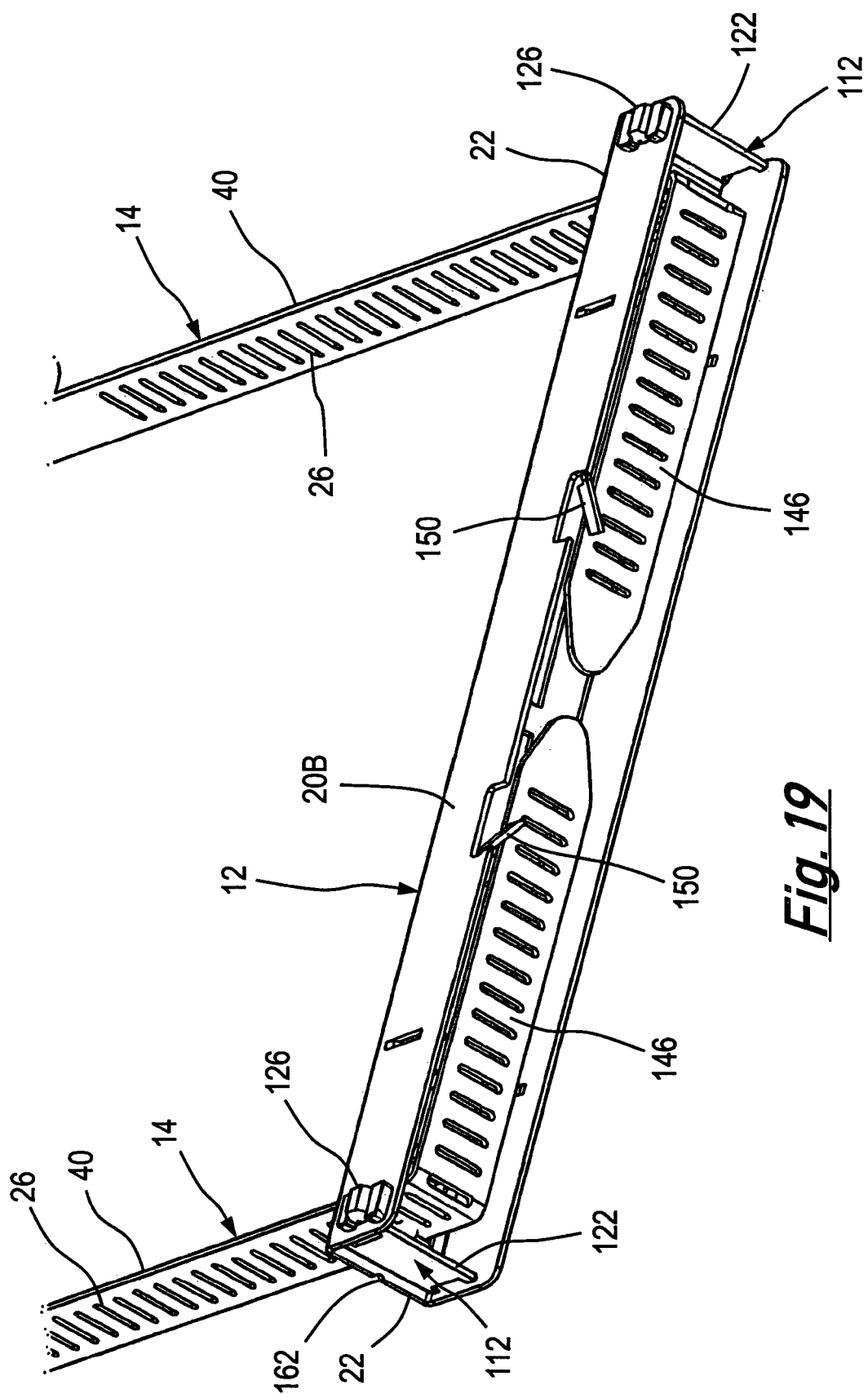
FIG. 19 is a perspective view from below showing the holding formations in the holding position.
Figure 20:
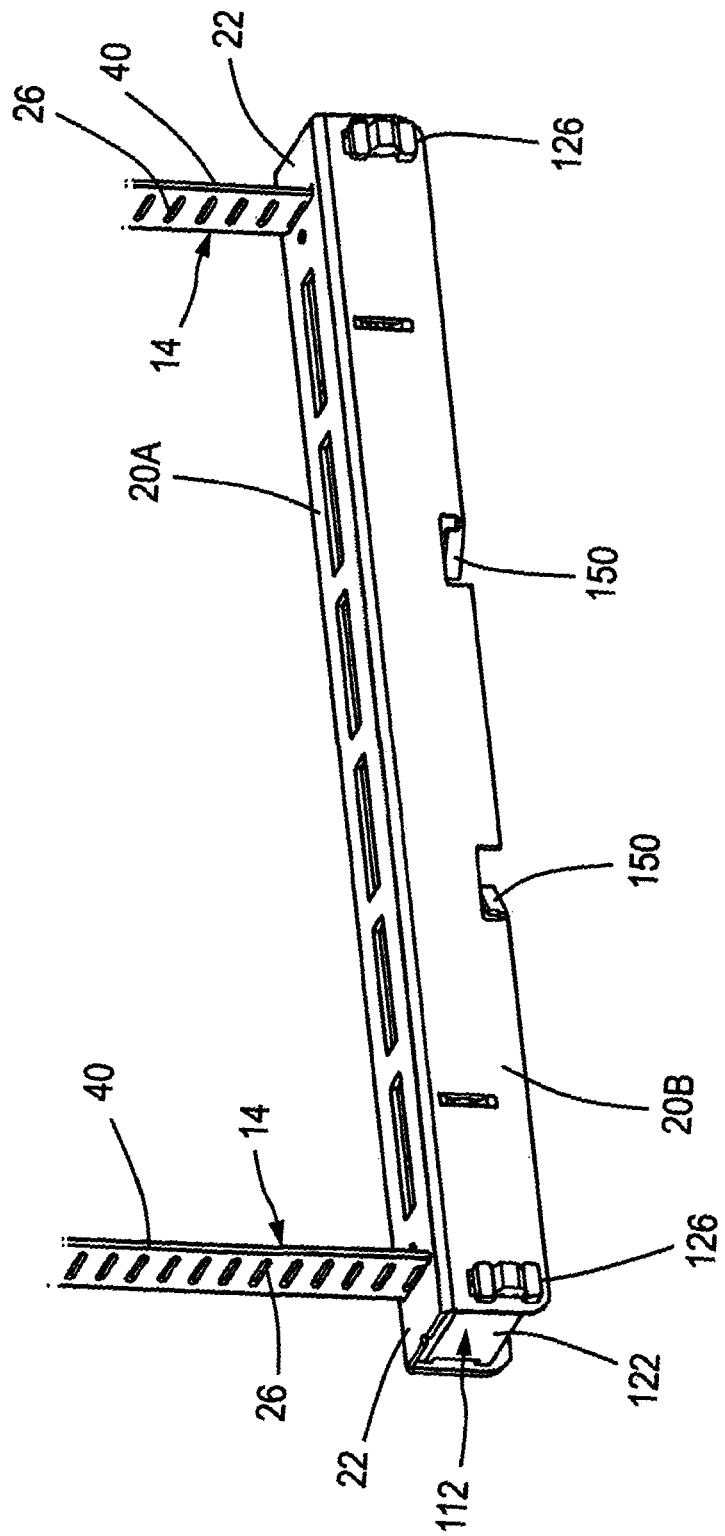
FIG. 20 is a perspective view similar to FIG. 16, showing the holding formations in a holding position.
Figure 21:
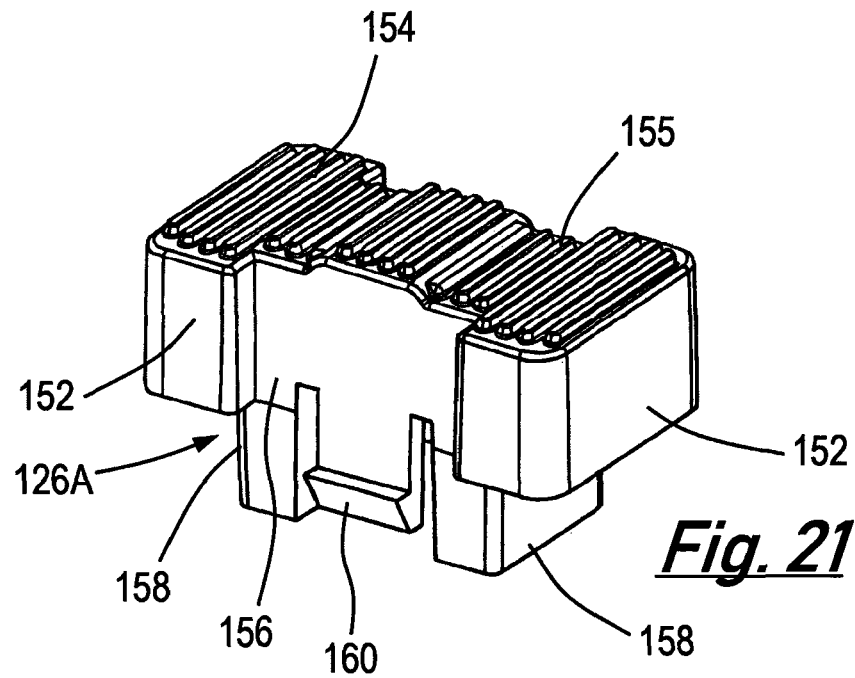
FIG. 21 is a perspective view of a second locking member.
Figure 22:
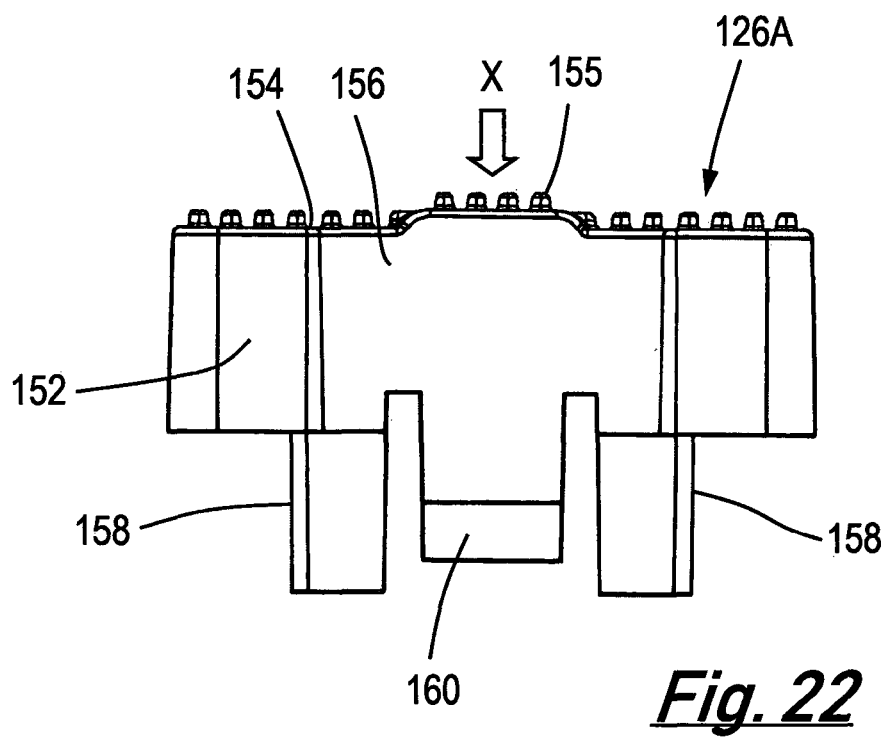
FIG. 22 is a side view of the second locking member shown in FIG. 21.
Figure 23:
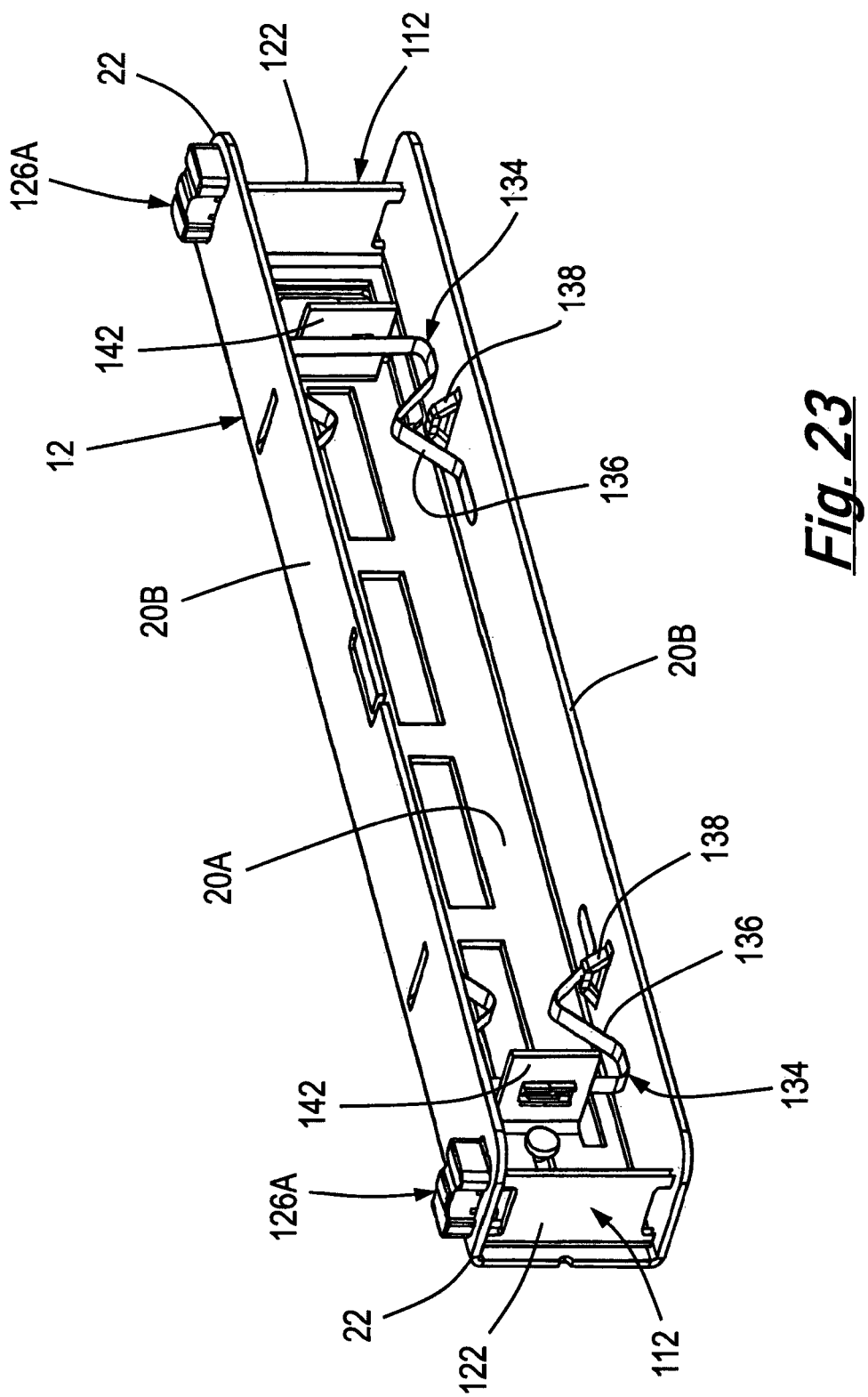
FIG. 23 is a perspective view of a support member with the second locking members thereon.
Figure 24:
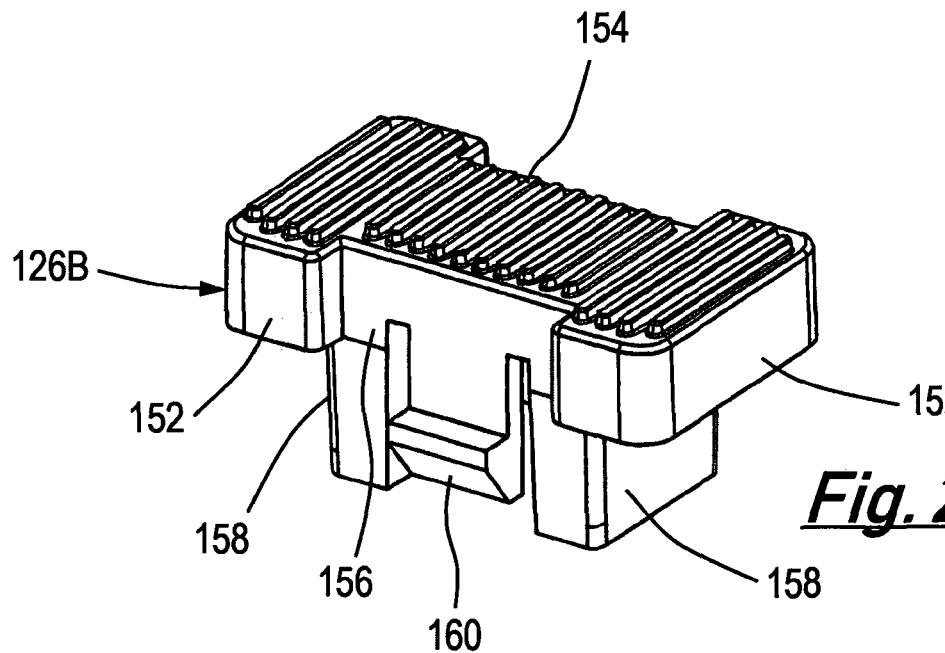
FIG. 24 is a perspective view of a third locking member.
Figure 25:
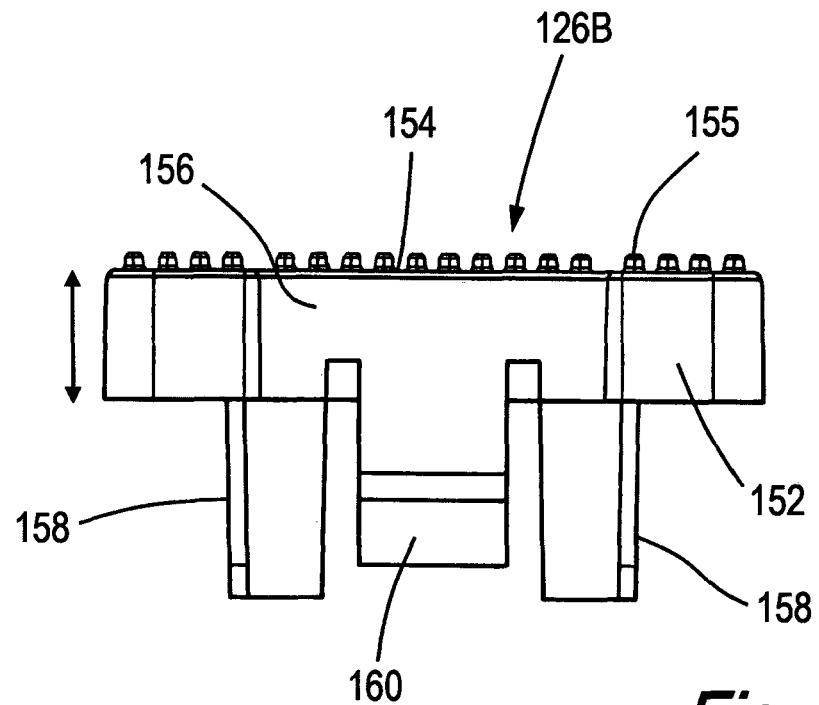
FIG. 25 is a side view of the third locking member shown in FIG. 24.
Figure 26:
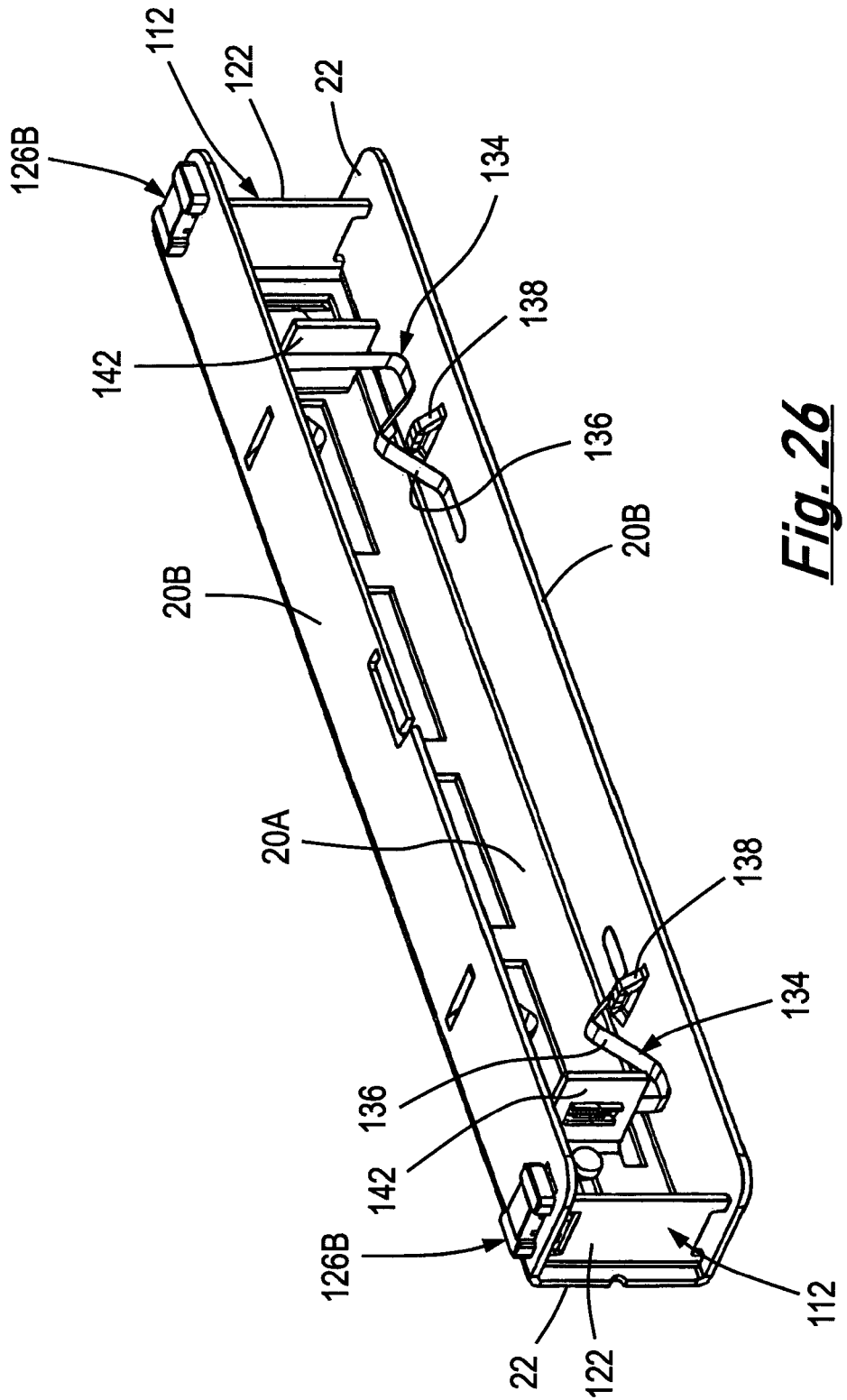
FIG. 26 is a perspective view of a support member with the third locking members thereon.

Prior to use, each of the holding tabs 150 is in a non-holding position aligned with the wall portion 20B, as shown in FIGS. 16 and 17. Each of the holding tabs 150 is deformably movable to a holding position by being bent along its end attached to the wall portion 20B towards the opposite wall portion 20B, as shown in FIGS. 18, 19 and 20.

When the strips 14 are deformed so that the stowed regions 146 extend along the support member 12, there can be a tendency for the stowed regions 146 to hang downwardly from the support member 12, as shown in FIG. 16. In order to prevent this, the stowed regions 146 are pushed between the wall portions 20B of the support member 12.

The holding tabs 150 are then deformed to their holding positions to extend underneath and across each of the stowed regions 146 of the strips 14, thereby holding the stowed regions 146 in their stowed positions between the wall portions 20B.

It will be appreciated that the number of holding tabs 150 could be varied. The number of holding tabs 150 may depend upon the length of the support member 12. For example, in situations where the support member 12 is short, the support member may have only one holding tab 150 to hold both stowed regions 146.

Further modifications are shown in FIGS. 21 to 26. In the modification shown in FIGS. 21 to 23, the locking members 126 are replaced by second locking members 126A on the support member 12. In the modification shown in FIGS. 24 to 26, the locking members 126 are replaced by third locking members 126B on the support member 12.

Each of the second and third locking members 126A, 126B is larger than the locking member 126 and is, thereby, more robust. Each of the second and third locking members 126A, 126B has a plurality of side members in the form of side walls 152.

Each of the second and third locking members 126A, 126B may have four of the side walls 152.

Each of the second and third locking members 126A, 126B also has a transverse portion 154 having ribs 155. The transverse portion 154 extends between the walls 152. The transverse portion 154 is substantially flat, to help prevent the locking member 126 deforming under an external load X, such as a packing/delivery load or caused by being dropped.

Two opposite side walls 152 of the second and third locking members 126A, 126B each have a recessed middle portion 156.

All the locking members 126, 126A, 126B have a pair of opposed insertion members 158 extending between the opposite recessed middle portions 156. A respective detent member 160 extends from each of the recessed portions 156. When the locking members 126, 126A, 126B are mounted on the support member 12, the insertion members 158 are received in one of the apertures 127 at an end regions 22 of the support 12. The insertion members 158 locate the locking member 126, 126A, or 126B over the aperture 127 and the detent members 160 hook over opposite edges of the aperture 127. Thus, the detent members 160 secure the locking member 126, 126A or 126B to the support 12.

Each end 22 of the elongate central portion 20A of the support 12 defines a notch 162 which is directly aligned with the aperture 44 in the respective attaching portion 42. Thus, the elongate central portion provides a template to allow an installer to use the support 12 to mark the position on the ceiling for screws to attach the strips 14 thereto. The installer arranges the central portion 20A of the support 12 against the ceiling and marks the ceiling with a pen at each of the notches. This provides the centre marks for the drill hole so that the strips 14 are in the right position to be received through the openings 24 in the central portion 20A.

The invention claimed is:

1. A suspension assembly comprising:
a support member for supporting an article;
an elongate substantially flat strip; and
a securing arrangement;
the support member defining an opening through which the strip can be inserted, and the strip defining a plurality of apertures, wherein the securing arrangement includes a securing member receivable through a selected one of the apertures in the strip to secure the support member to the strip, wherein the securing member comprises a latch member, the latch member being movable between securing and non-securing positions;
whereby, in the securing position, the strip is secured to the support member, and the latch member is received by one of the apertures in the strip;
wherein the securing arrangement comprises urging means for urging the latch member to the securing position.

2. A suspension assembly according to claim 1, comprising first and second of the substantially flat strips, wherein the support member defines first and second openings through each of which a respective strip can be inserted, each of the first and second strips defining a plurality of apertures, and the securing arrangement including respective first and second securing members receivable through a respective selected one of the apertures in each strip to secure the support member to the strips.

3. A suspension assembly according to claim 2, wherein the support member is elongate, and each of the first and second openings is defined at opposite end regions of the support member.

4. A suspension assembly according to claim 2, wherein each of the first and second openings is elongate.

5. A suspension assembly according to claim 2, wherein the aperture defined in the strip is a slot.

6. A suspension assembly according to claim 2, wherein each securing member comprises a respective latch member.

7. A suspension assembly according to claim 6, wherein each latch member is movable between securing and non-securing positions, whereby in the securing position, each strip is secured to the support member, and each latch member is received by one of the apertures in the respective strip.

8. A suspension assembly comprising:
a support member for supporting an article:
an elongate substantially flat strip; and
a securing arrangement;
the support member defining an opening through which the strip can be inserted, and the strip defining a plurality of apertures, wherein the securing arrangement includes a securing member receivable through a selected one of the apertures in the strip to secure the support member to the strip, wherein the securing member comprises a latch member, the latch member being movable between securing and non-securing positions;
whereby, in the securing position, the strip is secured to the support member, and the latch member is received by one of the apertures in the strip;
wherein the securing arrangement comprises at least one resilient urging member for urging the latch member to the securing position to be received by the aperture in the strip.

9. A suspension assembly according to claim 8, wherein the urging member comprises a pair of opposite legs, the legs being shaped to provide resilience to the urging means.

10. A suspension assembly according to claim 9, wherein the urging member comprises a leaf spring attached to the support member.

11. A suspension assembly according to claim 9, wherein the support member comprises a pair of opposed wall portions, each wall portion including an attachment element to attach the urging means to the support member, and wherein each attachment element cooperates with a respective one of the legs to attach the urging means to the support member.

12. A suspension assembly comprising:
a support member for supporting an article:
an elongate substantially flat strip; and
a securing arrangement;
the support member defining an opening through which the strip can be inserted, and the strip defining a plurality of apertures, wherein the securing arrangement includes a securing member receivable through a selected one of the apertures in the strip to secure the support member to the strip, wherein the securing member comprises a latch member, the latch member being movable between securing and non-securing positions;
whereby, in the securing position, the strip is secured to the support member, and the latch member is received by one of the apertures in the strip;
wherein the securing arrangement comprises urging means for urging the latch member to the securing position;
wherein the latch member comprises a main portion and an insertion portion on the main portion, the insertion portion being inserted through the selected aperture in the strip to secure the strip to the support member, and the latch member further comprising an end portion connected to the main portion, the end portion extending transverse to the main portion.

13. A suspension assembly according to claim 12, wherein the end portion extends across an end region of the support member, to allow the latch member to be pushed into the support member by pushing the end portion.

14. A suspension assembly according to claim 1, wherein the latch member defines an elongate aperture to allow the latch member to be slidably mounted on the support member, and wherein the suspension assembly comprises at least one mounting member on the support member to attach the latch member to the support member.

15. A suspension assembly according to claim 12, comprising a locking arrangement to lock the latch member in the securing position, the locking arrangement comprising at least one locking member, wherein the locking member is movable between locked and unlocked positions.

16. A suspension assembly according to claim 15, wherein the end portion has inner and outer lugs, and the locking member is arranged so that, when the latch member is in the non-securing position, the locking member is received between the lugs so that the locking member engages one of the lugs when the locking member is moved towards the locked position.

17. A suspension assembly according to claim 1, wherein the strip is deformable to a stowed condition, in which a stowable region of the strip extends along the support member.

18. A suspension assembly according to claim 17, wherein the support member includes a holding formation to hold the aforesaid stowable region of the strip in the stowed condition, the holding formation being movable from a non-holding position to a holding position, whereby when the holding formation is in the holding position, the holding formation extends across the stowable region of the strip to hold said stowable region in the aforesaid stowed condition.

19. A suspension assembly according to claim 18, wherein the support member comprises a central portion and at least one wall portion extending from the central portion, the holding formation being provided on one of the wall portions.

20. A suspension assembly according to claim 19, wherein the wall portion has first and second opposite edges, the wall portion being attached to the main portion along the first edge, the second being a free edge, and wherein the holding formation is provided along the free edge of the wall portion.

* * * * *